US008886364B2

(12) United States Patent
Takahara et al.

(10) Patent No.: US 8,886,364 B2
(45) Date of Patent: Nov. 11, 2014

(54) METHOD AND APPARATUS FOR DETERMINING TRAVELING CONDITION OF VEHICLE

(75) Inventors: Masatoshi Takahara, Okasaki (JP); Teru Konishi, Okazaki (JP); Hiroaki Sugiura, Okazaki (JP); Masaki Nakamura, Okazaki (JP); Koichi Hara, Toyota (JP); Daisuke Konaka, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 400 days.

(21) Appl. No.: 12/312,548

(22) PCT Filed: Nov. 16, 2007

(86) PCT No.: PCT/JP2007/072253
§ 371 (c)(1),
(2), (4) Date: May 15, 2009

(87) PCT Pub. No.: WO2008/062721
PCT Pub. Date: May 29, 2008

(65) Prior Publication Data
US 2010/0088024 A1 Apr. 8, 2010

(30) Foreign Application Priority Data

Nov. 20, 2006 (JP) .................. 2006-313507
Nov. 20, 2006 (JP) .................. 2006-313508
Nov. 20, 2006 (JP) .................. 2006-313509

(51) Int. Cl.
*G01C 21/20* (2006.01)
*G08G 1/0962* (2006.01)
(Continued)

(52) U.S. Cl.
CPC ......... *B60W 40/076* (2013.01); *G08G 1/09623* (2013.01); *G01C 21/3658* (2013.01); *B60W*
(Continued)

(58) Field of Classification Search
CPC .................. G01C 21/3658; G01C 21/3655

USPC ............. 701/400, 437, 532, 533; 340/995.2, 340/995.27, 988, 435
See application file for complete search history.

(56) References Cited

U.S. PATENT DOCUMENTS 5,902,350 A * 5/1999 Tamai et al. ................. 701/437
6,577,334 B1 * 6/2003 Kawai et al. ................. 348/148
(Continued)

FOREIGN PATENT DOCUMENTS

JP    A-10-141491    5/1998
JP    A-11-53685     2/1999
(Continued)

OTHER PUBLICATIONS

Japanese Patent Office, Notification of Reason for Refusal mailed Jan. 25, 2011 in Japanese Patent Application No. 2006-313509 w/Partial English-language Translation.
(Continued)

*Primary Examiner* — Ryan Zeender
*Assistant Examiner* — Milena Racic
(74) *Attorney, Agent, or Firm* — Oliff PLC

(57) ABSTRACT

A support control unit for determining a traveling condition of a host vehicle during an exit from a main road to an access road determines whether or not the condition of the host vehicle at a given point in time corresponds to an exit start scene or an exit completion scene for detecting the start of an exit or completion of the exit on the basis of a host vehicle position, route data, map rendering data, or lane information including at least road surface marking positions, and determines that an exit start timing or an exit completion timing of the host vehicle has arrived when the condition is determined to correspond to the exit start scene or the exit completion scene. Hence, during the exit from the main road to the access road, the traveling condition of the host vehicle can be determined accurately. The support control unit also determines the traveling condition of the host vehicle during convergence with the main road from the access road.

8 Claims, 20 Drawing Sheets

(51) Int. Cl.
*G01C 21/36* (2006.01)
*B60W 40/076* (2012.01)
*B60W 40/072* (2012.01)
*G08G 1/16* (2006.01)

(52) U.S. Cl.
CPC ............... 2550/402 (2013.01); *B60W 2550/22* (2013.01); *B60W 2550/141* (2013.01); *B60W 40/072* (2013.01); *G01C 21/3655* (2013.01); *G08G 1/165* (2013.01)
USPC ............... 701/1; 701/533; 701/532; 701/437; 701/400; 340/995.2; 340/995.27; 340/988; 340/435

(56) References Cited

U.S. PATENT DOCUMENTS

| | | | |
|---|---|---|---|
| 6,597,986 B2 * | 7/2003 | Mikame | 701/211 |
| 6,700,505 B2 * | 3/2004 | Yamashita et al. | 340/988 |
| 6,728,634 B2 * | 4/2004 | Monde et al. | 701/425 |
| 6,934,627 B2 * | 8/2005 | Kawakami et al. | 701/210 |
| 7,808,523 B2 * | 10/2010 | Nishida et al. | 348/148 |
| 2001/0056326 A1 | 12/2001 | Kimura | |
| 2002/0145665 A1 * | 10/2002 | Ishikawa et al. | 348/148 |
| 2006/0009904 A1 * | 1/2006 | Sakashita et al. | 701/200 |
| 2007/0032943 A1 * | 2/2007 | Okabe | 701/200 |

FOREIGN PATENT DOCUMENTS

| | | |
|---|---|---|
| JP | A-11-072337 | 3/1999 |
| JP | A-2000-233661 | 8/2000 |
| JP | A-2000-293782 | 10/2000 |
| JP | A-2001-289654 | 10/2001 |
| JP | A-2002-054937 | 2/2002 |
| JP | A-2002-122436 | 4/2002 |
| JP | A-2006-244143 | 9/2006 |
| JP | A-2007-042003 | 2/2007 |
| JP | A-2007-153031 | 6/2007 |

OTHER PUBLICATIONS

Japanese Patent Office, Notification of Reason(s) for Refusal mailed Feb. 28, 2012 in Japanese Patent Application No. 2006-313507 w/Partial English-language Translation.

Japanese Patent Office, Notification of Reason(s) for Refusal mailed Jul. 16, 2013 in Japanese Patent Application No. 2012-102672 w/Partial English-language Translation.

* cited by examiner

F I G. 17
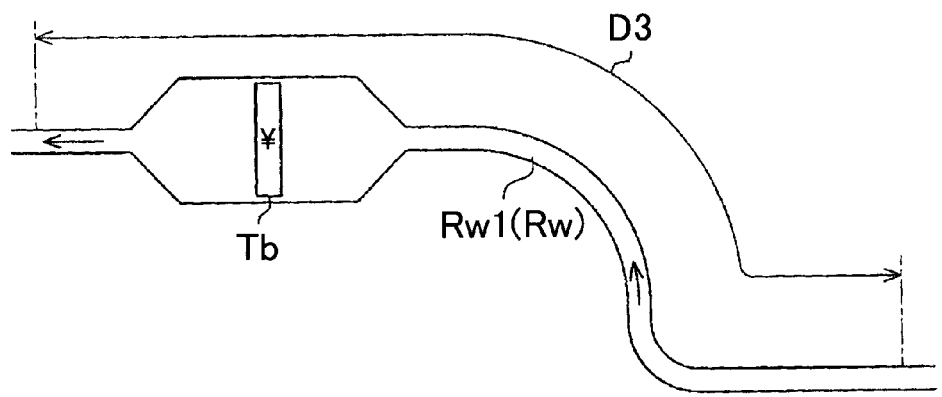
F I G. 18
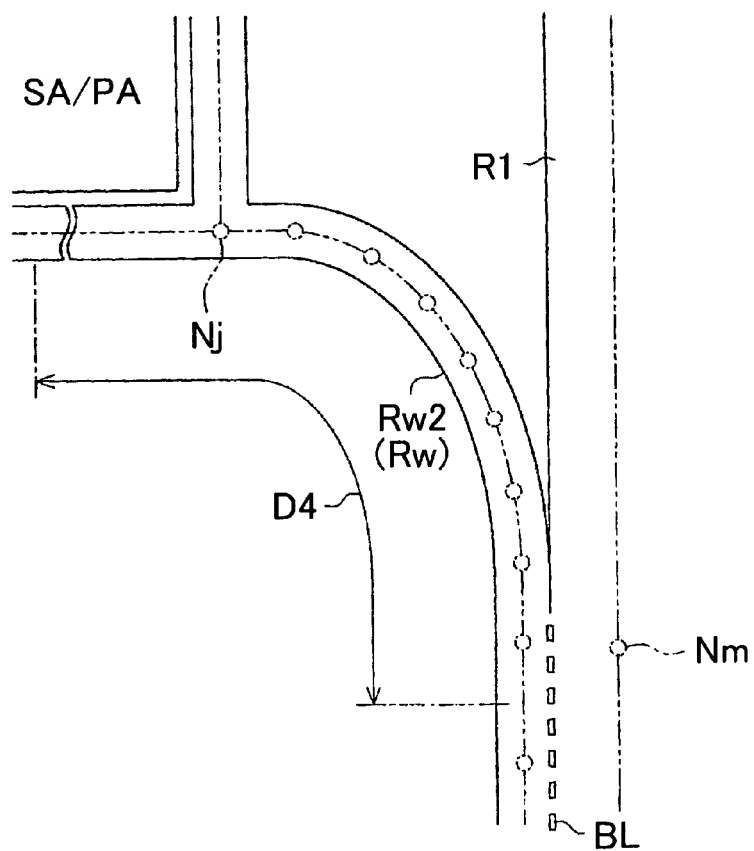

METHOD AND APPARATUS FOR DETERMINING TRAVELING CONDITION OF VEHICLE

TECHNICAL FIELD

The present invention relates to a method and an apparatus for determining a traveling condition of a vehicle.

BACKGROUND ART

In recent years, the development of Intelligent Transport Systems (ITS) has progressed with the aim of achieving smooth automobile travel. As a part of ITS, a driving support system that uses a navigation system installed in an automobile to provide information, warnings, operation support, and so on corresponding to the geographical location of the automobile has been proposed. For example, Patent Document 1 and Patent Document 2 describe systems for controlling a downshift in cases such as when a host vehicle exits a main road of an expressway and moves onto a deceleration lane such as an off-ramp.

In each of the systems described above, an error may occur in a host vehicle position calculated by the navigation system. Therefore, a control subject section is set in advance, and when the host vehicle enters the section, vehicle control is performed. Therefore, driving control may not be executed at an accurate timing, for example deceleration control may be performed before the host vehicle enters the deceleration lane. As a result, the driver may experience an unpleasant sensation, and moreover, smooth travel of other vehicles on the main road may be impaired. Furthermore, if a delay occurs in the timing at which convergence-related driving support is performed during convergence, acceleration prior to the convergence may be insufficient, causing an obstruction to the travel of other vehicles on the main road.

Patent Document 1: Japanese Patent Application Publication No. JP-A-H10-141491
Patent Document 2: Japanese Patent Application Publication No. JP-A-2000-293782

DISCLOSURE OF THE INVENTION

An object of the present invention is to provide a method and an apparatus for determining a traveling condition of a vehicle, with which the traveling condition of a host vehicle can be determined accurately during an exit from a main road or convergence with the main road.

According to an aspect of the present invention for achieving the object described above, a method of determining a traveling condition of a host vehicle during an exit from a main road to an access road is provided. The method includes: determining whether or not the condition of the host vehicle at a given point in time corresponds to an exit start scene for detecting the start of the exit on the basis of a host vehicle position, road network data including road types, and road surface marking property data including at least road surface marking positions; and determining an exit start timing of the host vehicle when the condition is determined to correspond to the exit start scene.

According to another aspect of the present invention, an apparatus for determining a traveling condition of a host vehicle during an exit from a main road to an access road is provided. The apparatus includes: a host vehicle position calculation unit for calculating a host vehicle position; a road network data storage unit storing road network data including road types; a marking data storage unit storing marking property data including at least road surface marking positions; a scene determination unit for determining whether or not the condition of the host vehicle at a given point in time corresponds to an exit start scene for detecting the start of the exit to the access road on the basis of the host vehicle position, the road network data, and the marking property data; a timing determination unit for determining an exit start timing when the scene determination unit determines that the condition corresponds to the exit start scene; and a support control unit that outputs a control signal for performing driving support during the start of the exit when the timing determination unit detects the exit start timing.

According to a further aspect of the present invention, a method for determining a traveling condition of a host vehicle during an exit from a main road to an access road is provided. The method includes: determining whether or not the condition of the host vehicle at a given point in time corresponds to an exit completion scene for detecting completion of the exit on the basis of a host vehicle position and road network data including road types; and determining an exit completion timing of the host vehicle when the condition is determined to correspond to the exit completion scene.

According to a further aspect of the present invention, an apparatus for determining a traveling condition of a host vehicle during an exit from a main road to an access road is provided. The apparatus includes: a host vehicle position calculation unit for calculating a host vehicle position; a road network data storage unit storing road network data including road types; a scene determination unit for determining whether or not the condition of the host vehicle at a given point in time corresponds to an exit completion scene for detecting completion of the exit to the access road on the basis of the host vehicle position and the road network data; a timing determination unit for determining an exit completion timing when the scene determination unit determines that the condition corresponds to the exit completion scene; and a support control unit that outputs a control signal for performing driving support during completion of the exit when the timing determination unit detects the exit completion timing.

According to a further aspect of the present invention, a method for determining a traveling condition of a host vehicle during convergence with a main road from an access road is provided. The method includes: determining whether or not the condition of the host vehicle at a given point in time corresponds to a convergence start scene for detecting the start of convergence on the basis of a host vehicle position and road network data including road types; and determining a convergence start timing of the host vehicle when the condition is determined to correspond to the convergence start scene.

According to a further aspect of the present invention, an apparatus for determining a traveling condition of a host vehicle during convergence with a main road from an access road is provided. The apparatus includes: a host vehicle position calculation unit for calculating a host vehicle position; a road network data storage unit storing road network data including road types; a scene determination unit for determining whether or not the condition of the host vehicle at a given point in time corresponds to a convergence start scene for detecting the start of convergence on the basis of the host vehicle position and the road network data; a timing determination unit for determining a convergence start timing on the basis of the convergence start scene when the scene determination unit determines that the condition corresponds to the convergence start scene; and a support control unit that outputs a control signal for performing driving support during the start of convergence when the timing determination unit detects the convergence start timing.

According to a further aspect of the present invention, a method for determining a traveling condition of a host vehicle during convergence with a main road from an access road is provided. The method includes: determining whether or not the condition of the host vehicle at a given point in time corresponds to a convergence completion scene for detecting convergence completion on the basis of a host vehicle position, road network data including road types, and road surface marking property data including at least road surface marking positions; and determining a convergence completion timing of the host vehicle when the condition is determined to correspond to the convergence completion scene.

According to a further aspect of the present invention, an apparatus for determining a traveling condition of a host vehicle during convergence with a main road from an access road is provided. The apparatus includes: a host vehicle position calculation unit for calculating a host vehicle position; a road network data storage unit storing road network data including road types; a marking data storage unit storing road surface marking property data including at least road surface marking positions; a scene determination unit for determining whether or not the condition of the host vehicle at a given point in time corresponds to a convergence completion scene for detecting convergence completion on the basis of the host vehicle position, the road network data, and the road surface marking property data; a timing determination unit for determining a convergence completion timing on the basis of the convergence completion scene when the scene determination unit determines that the condition corresponds to the convergence completion scene; and a support control unit that outputs a control signal for performing driving support during convergence completion when the timing determination unit detects the convergence completion timing.

BRIEF DESCRIPTION OF THE DRAWINGS

FIG. 17 is an illustrative view of a first exit completion scene.

FIG. 18 is an illustrative view of a second exit completion scene.

BEST MODES FOR CARRYING OUT THE INVENTION

A specific embodiment of the present invention will be described below in accordance with FIGS. 1 to 27.

Figure 1:
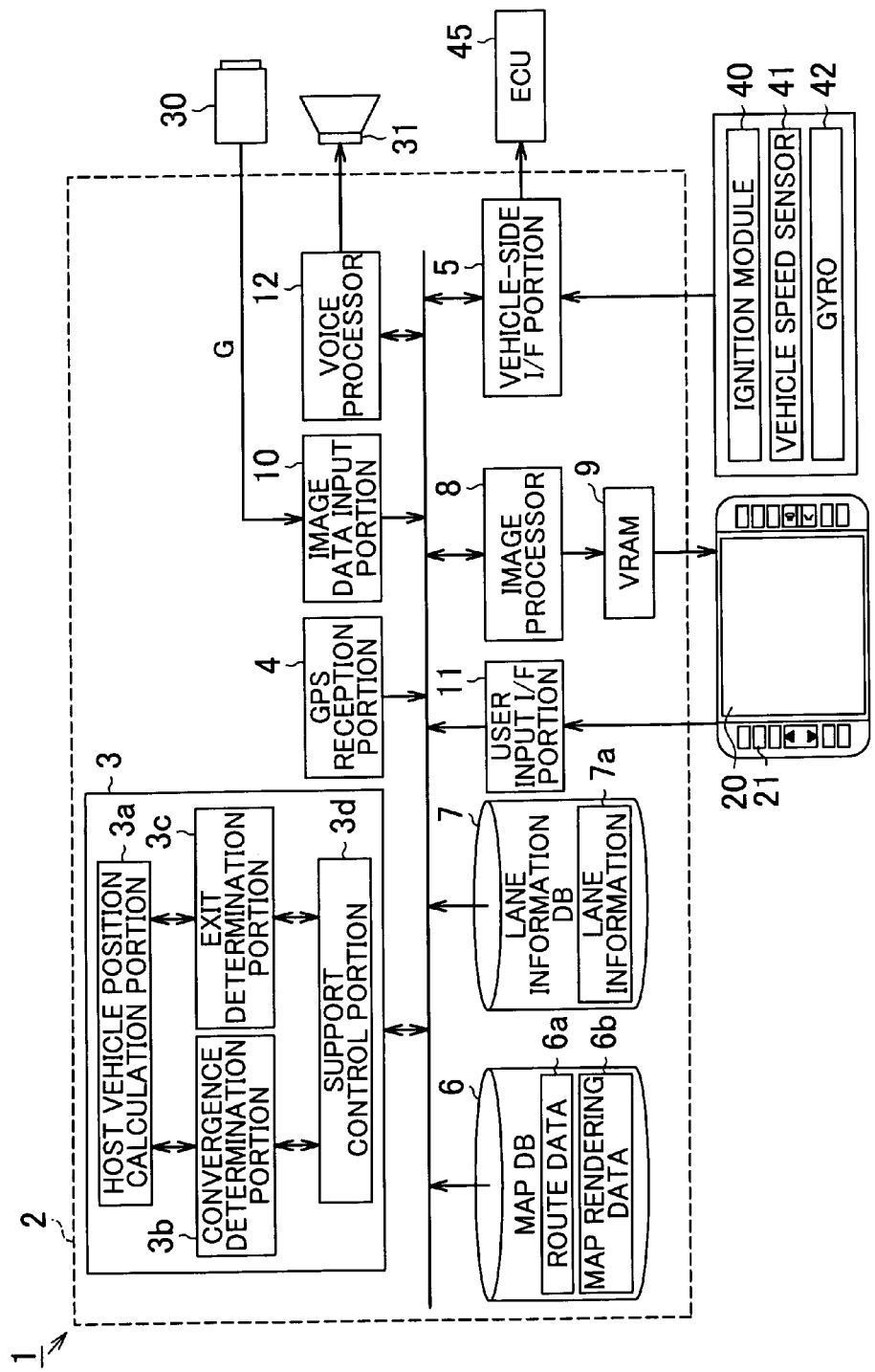
FIG. 1 is a block diagram of a driving support system according to an embodiment.

As shown in FIG. 1, a driving support system 1 installed in a host vehicle C (see FIG. 3) includes a support control unit 2 serving as a traveling condition determination apparatus, a display 20 for displaying various screens, a back monitor camera 30 serving as an imaging apparatus, and a speaker 31.

The support control unit 2 includes a navigation unit 3. The navigation unit 3 is constituted by an LSI or the like, and performs main control of various processes in accordance with various programs, such as a driving support program, stored in a storage portion. The navigation unit 3 includes a host vehicle position calculation portion 3a, a convergence determination portion 3b, an exit determination portion 3c serving as a scene determination portion and a timing determination portion, and a support control portion 3d.

The host vehicle position calculation portion 3a calculates an absolute coordinate indicating a position of the host vehicle C on the basis of a position detection signal received from a GPS reception portion 4 provided in the support control unit 2. Further, the support control unit 2 includes a vehicle-side I/F portion 5 for receiving detection signals from various sensors provided in the host vehicle C. The vehicle-side I/F portion 5 receives an ON signal and an OFF signal in relation to an ignition module 40 provided in the host vehicle C from the ignition module 40, and transmits the received signal to the navigation unit 3. The navigation unit 3 activates the driving support system 1 upon reception of an ON signal and shuts down the driving support system 1 upon reception of an OFF signal.

Further, the host vehicle position calculation portion 3a receives a vehicle speed pulse from a vehicle speed sensor 41 provided in the host vehicle C via the vehicle-side I/F portion 5, and counts the pulse count. Further, the host vehicle position calculation unit 3a receives a bearing detection signal from a gyro 42 via the vehicle-side I/F portion 5, and calculates the host vehicle position in accordance with an autonomous navigation method. The host vehicle position calculation portion 3a then specifies the current position of the vehicle by correcting the absolute position calculated on the basis of the GPS reception portion 4 using the host vehicle position calculated in accordance with the autonomous navigation method.

The convergence determination portion 3b uses a lane information database (DB) 7 serving as marker data storage means to determine whether or not the host vehicle C has begun to converge and whether or not convergence onto a main road R1 (see FIG. 2) is complete. Further, the exit determination portion 3c uses the lane information DB 7 to determine whether or not the host vehicle C has begun to exit the main road R1 and whether or not the exit from the main road R1 is complete.

The lane information DB 7 stores lane information 7a serving as road surface marker property data. The lane information 7a includes data such as the number of lanes of a toll road, types of white line markers partitioning the lanes (for example, solid lines and broken lines), and the positions of the white line markers.

Figure 2:
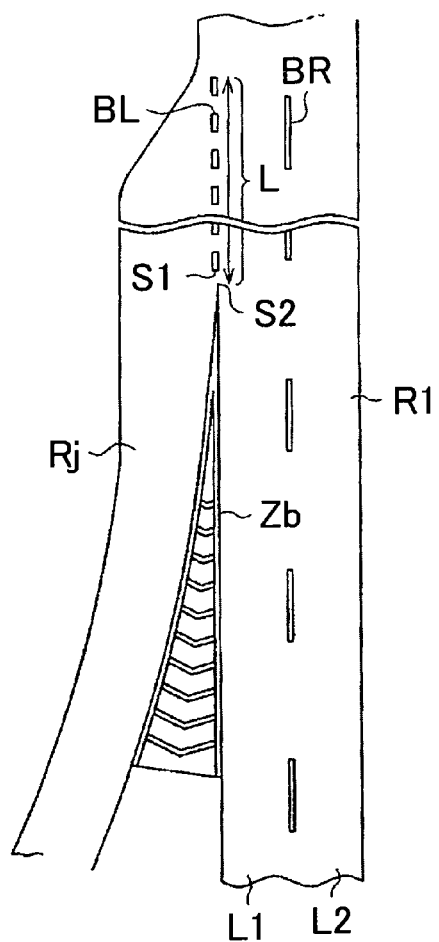
FIG. 2 is an illustrative view of an access road.

For example, as shown in FIG. 2, in the case of a white line (to be referred to hereafter as a thick broken line BL) that has a greater line width than a boundary line BR between lanes L1 and L2 and is positioned between a convergence road Rj serving as an access road and the main road R1 as a marker and a convergence section, the position and length L of the thick broken line BL are stored in the lane information 7a. The lane information 7a also stores a thick broken line start point S1 serving as a reference point at which the thick broken line BL starts, the position of a zebra zone Zb serving as a marker when such a zebra zone Zb exists, and a start point S2 serving as a reference point of the zebra zone Zb. When used in this specification, the term "access road" denotes an acceleration lane, a deceleration lane, a crawler lane and so on, as well as a traveling lane other than a main road.

The support control unit 3d determines the traveling condition of the host vehicle C on the basis of the determinations of the convergence determination portion 3b and the exit determination portion 3c, and executes control to provide information, a warning, or operation support at a point in time at which convergence begins or ends or a point in time immediately prior to an exit or upon completion of the exit. Further, the support control portion 3d transmits a control signal to an ECU (Electronic Control Unit) 45, such as an engine ECU or an ABS (Antilock Brake System) ECU, which is provided in the host vehicle C, via the vehicle-side I/F portion 5 in accordance with the content of the support.

The support control unit 2 also includes a map database (DB) 6 serving as a road network data storage portion. The map DB 6 stores route data 6a and map rendering data 6b as road network data. The route data 6a are data relating to each of a plurality of predetermined areas obtained by partitioning the entire country into areas, and include data relating to nodes and links, link costs, link types, coordinate data, road property data, and so on. The node data include identification data such as numbers for nodes indicating intersections, endpoints of roads, expressway junctions, and so on, identification data relating to adjacent nodes, and so on. The link data include a link ID, a link length, the link IDs indicating connected nodes, data indicating traffic regulations, and so on. The link type indicates the type of the road corresponding to the link, for example an expressway, a national road, and so on. The road property data are data indicating an advancement direction and so on.

The map rendering data 6b are stored in each of a plurality of areas obtained by dividing the entire country into areas, and are separated into strata from wide-area maps to narrow area maps. The map rendering data 6b include road rendering data, background data, and so on. The road rendering data are data relating to shape interpolation points indicating the shape of a road to be displayed on the map, data indicating services areas and parking areas (to be referred to as SA/PA hereafter) on expressways, and data indicating the positions of toll booths and so on. The background data are rendering data for rendering roads, urban areas, rivers, and so on.

The support control unit 2 also includes an image processor 8 serving as an image processing portion. In addition to performing image processing, the image processor 8 generates rendering data on the basis of the map rendering data 6b and stores the generated rendering data temporarily in a VRAM 9. Then, on the basis of the rendering data, the image processor 8 displays a map of the surroundings of the host vehicle position on the display 20.

Figure 3:
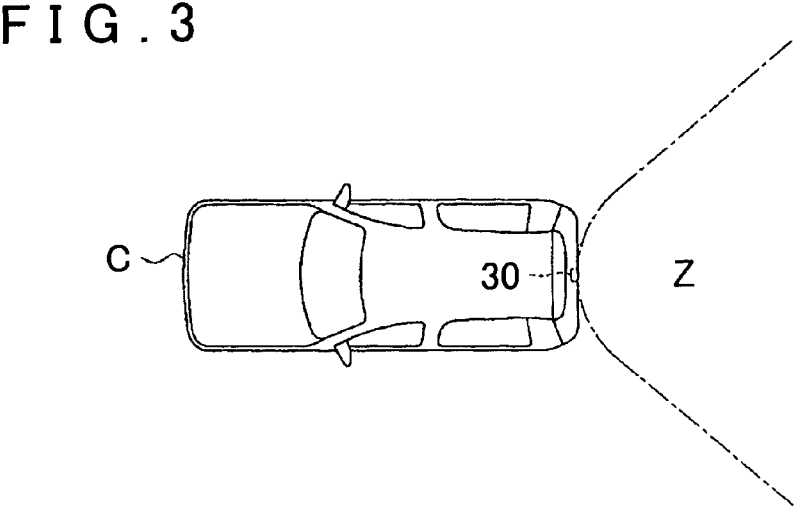
FIG. 3 is an illustrative view of a camera attachment position.

The support control unit 2 also includes an image data input portion 10. The image data input portion 10 drives the camera 30 provided in the host vehicle C in accordance with the control of the navigation unit 3 to obtain image data G successively in the form of image signals. As shown in FIG. 3, the camera 30 is attached to a rear end of the vehicle, for example on the back door of the host vehicle C. The camera 30 is a digital camera for capturing color images, and includes an optical mechanism constituted by a wide angle lens, a mirror, and so on, and a CCD imaging device (neither of which are shown in the drawing). An imaging range Z of the camera 30 extends for several meters rearward, including the rear end of the host vehicle C. The image data input portion 10 obtains the image data G following analog/digital conversion by the camera 30, and transmits the image data G to the image processor 8.

The image processor 8 performs well-known white line recognition processing on the received image data G. For example, the image processor 8 performs edge detection processing on the image data G and detects a straight line by performing a Hough transform or the like on a detected edge point. A straight line extending in a road surface direction is then recognized as a white line. When a plurality of edges are detected at equal intervals, the image processor 8 determines that the edges constitute the thick broken line BL on the basis of the shape thereof.

Further, when the image processor 8 detects an edge, it converts the edge detection image into a bird's eye image. Then, using the bird's eye image, the image processor 8 calculates a relative distance and a relative direction between the white line and the host vehicle C. Further, upon detection of the thick broken line BL, the image processor 8 determines, at a predetermined timing, whether or not the host vehicle C has crossed the thick broken line BL. When the host vehicle C converges with the main road R1 side from the convergence road Rj side such that the image processor 8 determines that the host vehicle C has crossed the thick broken line BL, the convergence determination portion 3b determines that convergence is complete. Further, when the host vehicle C exits the main road R1 to an exit road Rw (see FIG. 18) such that the image processor 8 determines that the host vehicle C has crossed the thick broken line BL, the exit determination portion 3c determines that an exit has begun.

The support control unit 2 also includes a user input I/F portion 11. The display 20 is constituted by a touch panel, and when an input operation is performed on the touch panel, a signal corresponding to the input operation is transmitted to the navigation unit 3 via the user input I/F portion 11. Further, when an input operation is performed by the user on an operation switch 21 provided adjacent to the display 20, a signal corresponding to the input operation is similarly transmitted to the navigation unit 3 via the user input I/F portion 11.

The support control unit 2 also includes a voice processor 12. The voice processor 12 includes a memory storing voice files, a digital/analog converter, and so on, not shown in the drawings, and uses the voice files to output a guidance voice and warning sounds through the speaker 31.

Processing Procedures

Next, processing procedures of this embodiment will be described in accordance with FIGS. 4 to 14. In this embodiment, the driving support system 1 is described as a system for performing support when the host vehicle C converges with the main road R1 of an expressway or exits the main road R1.

Figure 4:
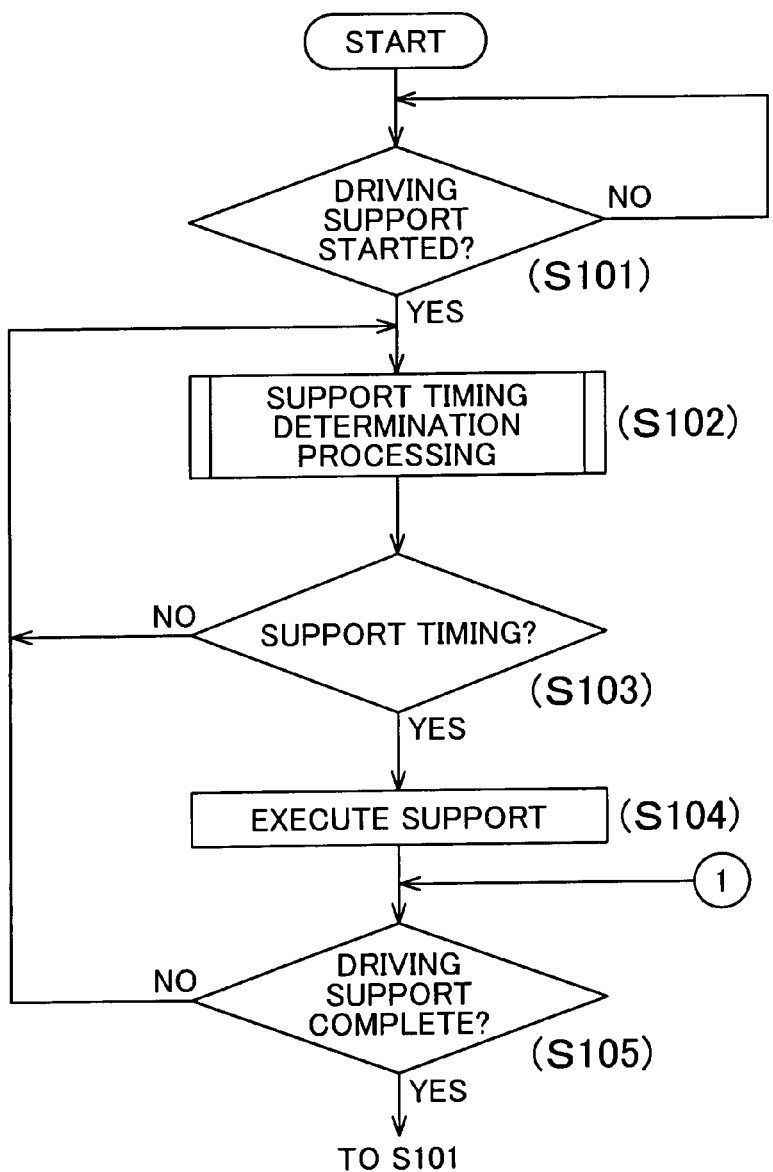
FIG. 4 is an illustrative view of a processing procedure of this embodiment.

FIG. 4 is a main flow of driving support processing. As shown in FIG. 4, the navigation unit 3 waits for the start of driving support (step S101). For example, when the host vehicle position is already located on an expressway and in the vicinity of an interchange of the expressway or the like, the navigation unit 3 may determine that driving support has begun. Alternatively, the navigation unit 3 may determine that driving support is underway whenever the driving support system 1 is activated.

Having determined that driving support has begun (YES in the step S101), the navigation unit 3 performs support timing determination processing (step S102). In the support timing determination processing, the convergence determination portion 3*b* and the exit determination portion 3*c* determine whether or not the current condition of the host vehicle C corresponds to any one of a convergence start scene, a convergence completion scene, an exit start scene, and an exit completion scene. When it is determined that the current condition of the host vehicle C corresponds to one of these scenes, timing determination processing corresponding to the scene is performed to detect a convergence start timing, a convergence completion timing, an exit start timing, or an exit completion timing.

Once support timing determination processing has been performed, the support control portion 3*d* of the navigation unit 3 determines whether or not the support timing has arrived on the basis of the detection results of the convergence determination portion 3*b* and the exit determination portion 3*c* (step S103). For example, when the convergence determination portion 3*b* determines that the current condition corresponds to the start of convergence (YES in the step S103), the support control portion 3*d* controls the ECU 45, the voice processor 12, and so on to execute support corresponding to the start of convergence (step S104). The content of the support is not necessarily limited to the provision of various types of information, warnings, operation support, and so on.

Once the support has been executed, the navigation unit 3 determines whether or not the driving support is complete (step S105). For example, when the host vehicle C exits the interchange of the expressway onto a normal road or the like, it is determined that the driving support is complete. When it is determined that the driving support is complete (YES in the step S105), the driving support processing is terminated, whereupon the procedure returns to the step S101 and waits for the driving support to resume. When it is determined that the driving support processing is not complete (NO in the step S105), the procedure returns to the step S102, in which the support timing determination processing is performed.

Support Timing Determination Processing

Figure 24:
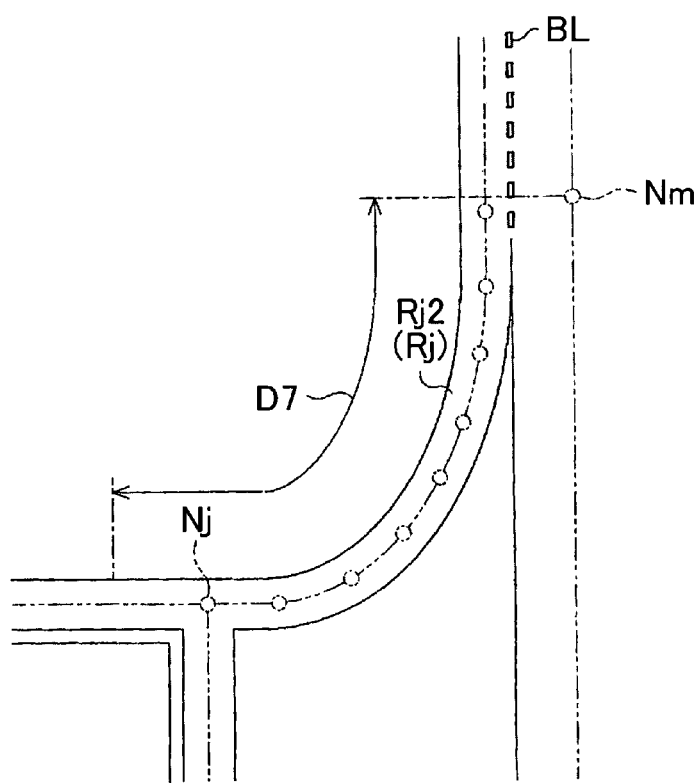
FIG. 24 is an illustrative view of a second convergence start scene.

Next, the support timing determination processing will be described in accordance with FIG. 5. First, the host vehicle position calculation portion 3*a* of the navigation unit 3 detects a fork ahead of the host vehicle C on the basis of the host vehicle position and the map DB 6 (step S1). At this time, the host vehicle position calculation portion 3*a* determines whether or not a node indicating a fork for converging with the main road R1 from the convergence road Rj, a fork for exiting the main road R1 onto the exit road Rw (see FIG. 18), or similar is located ahead of the host vehicle position and within a predetermined distance (1 km, for example) of the host vehicle position on the basis of the route data 6*a* and the map rendering data 6*b* (step S2). As shown in FIG. 24, a fork in a side road Rj2 of an SA/PA that converges with the main road R1 and a fork for exiting the main road R1 onto a side road Rw2 of an SA/PA, as shown in FIG. 18, are also detected.

Having determined the presence of a fork (YES in the step S2), the navigation unit 3 determines the type of road along which the host vehicle C is traveling from the convergence road Rj, the exit road Rw, and the main road R1 in steps S3 to S5. Having determined the type of road along which the host vehicle C is currently traveling, the navigation unit 3 determines, in accordance with the road type, whether the current state of the host vehicle C corresponds to the convergence completion scene, the exit completion scene, the exit start scene, or the convergence start scene in steps S6 to S9.

More specifically, first, the convergence determination unit 3*b* of the navigation unit 3 determines whether or not the host vehicle C is traveling along the convergence road Rj (step S3). At this time, the host vehicle position calculation unit 3*a* determines whether or not a convergence road travel flag stored in a memory not shown in the drawings is ON. The convergence road travel flag is a flag indicating whether or not the host vehicle C has traveled within a predetermined range of the convergence road Rj. When the host vehicle C is traveling along the convergence road Rj, the convergence road travel flag is ON, and at all other times, the flag is OFF.

Figure 15:
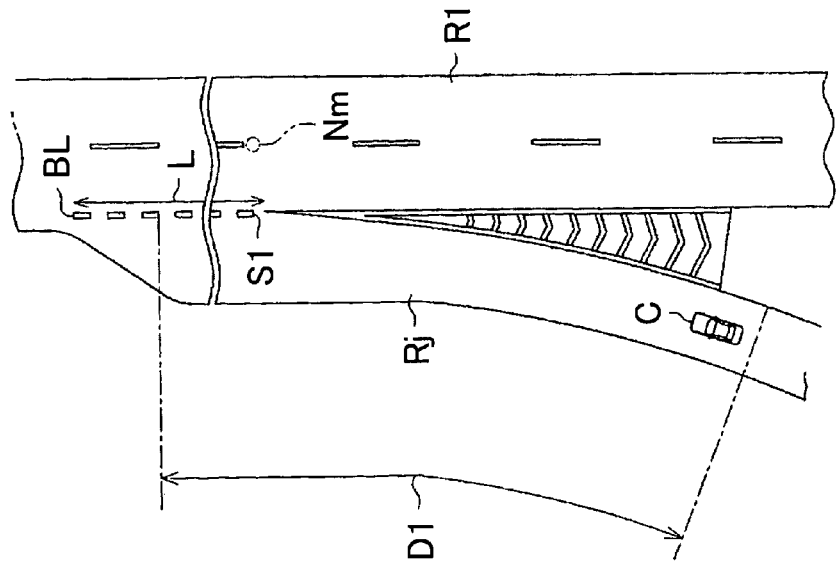
FIG. 15 is an illustrative view of a convergence completion scene.

In cases such as when the support timing determination processing is performed for the first time, the host vehicle position calculation portion 3*a* determines on the basis of the route data 6*a* or the link type of the map rendering data 6*b* whether or not the host vehicle position is located on a convergence road Rj connected to a main road R1, as shown in FIG. 15. The convergence road Rj may be a convergence road Rj that links a toll booth to the main road R1 or a side road Rj2 (see FIG. 24) connected to the main road R1 from an SA/PA. When the convergence determination unit 3*b* determines that the host vehicle C is traveling along the convergence road Rj (YES in the step S3), a convergence completion scene determination is performed (step S6). A convergence completion scene is a state in which the host vehicle C has completed convergence with the main road R1 from the convergence road Rj. The convergence completion scene determination is processing performed in advance to detect the timing of convergence completion accurately.

Convergence Completion Scene Determination

Figure 6:
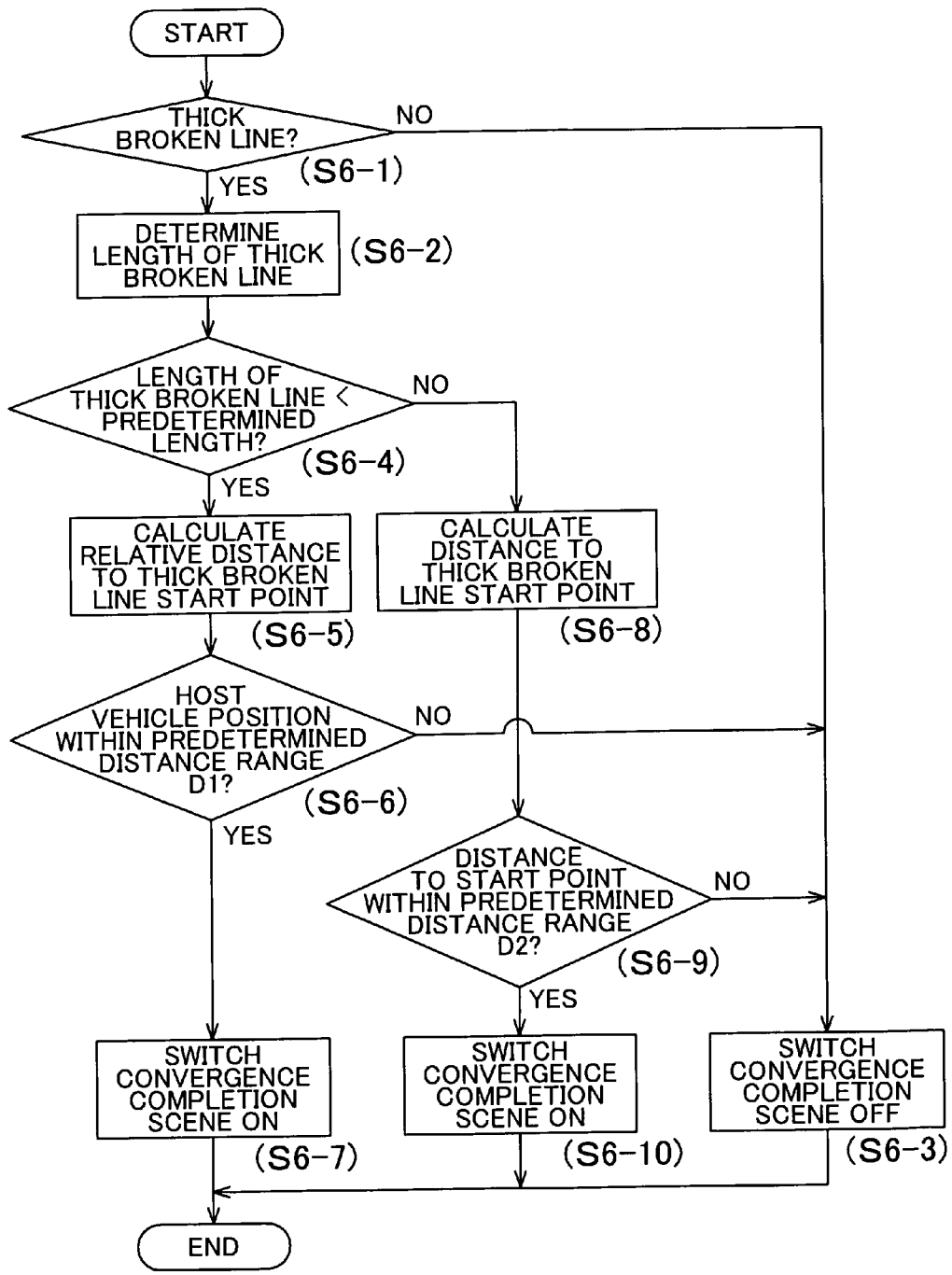
FIG. 6 is an illustrative view of a processing procedure of convergence completion scene determination processing.

The convergence scene determination will now be described in accordance with FIG. 6. First, the convergence determination portion 3*b* determines on the basis of the lane information 7*a* whether or not the thick broken line BL separating the convergence road Rj from the main road R1 is present (step S6-1). When the thick broken line BL is marked between the convergence road Rj and the main road R1 (YES in the step S6-1), as shown in FIG. 15, the procedure advances to a step S6-2.

In the step S6-2, the convergence determination portion 3*b* reads the length of the thick broken line BL on the basis of the lane information 7*a* and determines whether or not the length L (see FIG. 15) is less than a predetermined length (step S6-4). In this embodiment, the predetermined length is set at 300 m.

Having determined that the length L of the thick broken line BL is less than the predetermined length (300 m) (YES in the step S6-4), the convergence determination portion 3*b* calculates a relative distance from the host vehicle position to the thick broken line start point 51 (step S6-5). At this time, the convergence determination portion 3*b* obtains the coordinates of the thick broken line start point S1 from the lane information 7*a* and calculates the relative distance between the obtained coordinates and the host vehicle position. Here, the relative distance is calculated in accordance with the shape of the convergence road Rj, but a relative distance obtained when the thick broken line start point S1 and the host vehicle position are connected by a straight line may be calculated. On the basis of the calculated relative distance, the convergence determination portion 3*b* determines whether or not the host vehicle position is within a preset predetermined distance range D1 (step S6-6). Here, as shown in FIG. 15, the predetermined distance range D1 extends from 500 m before the thick broken line start point S1 to 150 m beyond the thick broken line start point S1.

After determining on the basis of the relative distance between the host vehicle position and the thick broken line start point S1 that the host vehicle position is within the predetermined distance range D1 (YES in the step S6-6), the convergence determination portion 3*b* switches a scene determination flag indicating the convergence completion scene ON (step S6-7).

Figure 16:
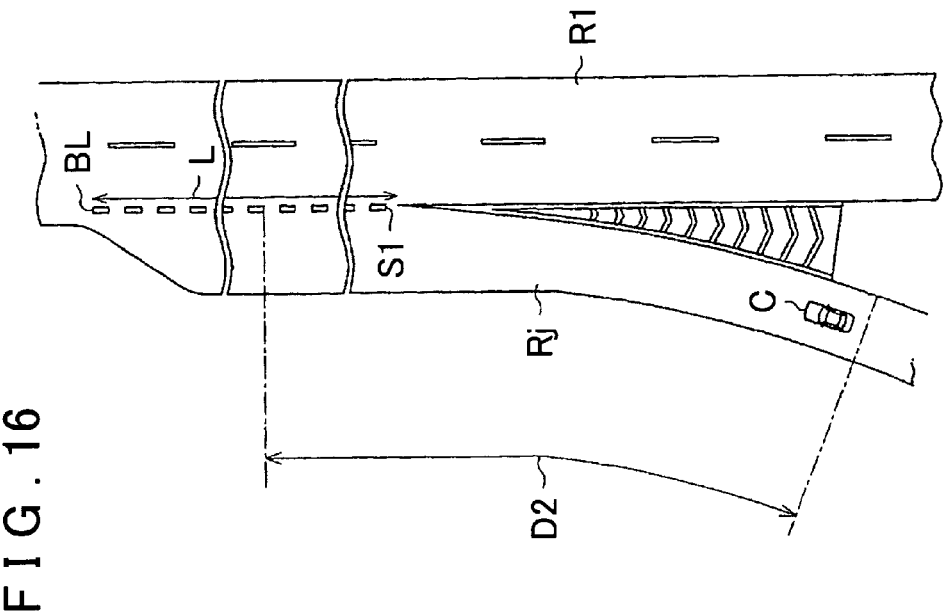
FIG. 16 is an illustrative view of another convergence completion scene.

On the other hand, when it is determined in the step S6-4 that the length L of the thick broken line BL is equal to or greater than the predetermined length (300 m), as shown in FIG. 16 (NO in the step S6-4), the relative distance from the host vehicle position to the thick broken line start point S1 is calculated in a similar manner to the step S6-5 (step S6-8). Further, similarly to the step S6-6, a determination is made as to whether or not the relative distance from the host vehicle position to the thick broken line start point 51 is within a predetermined distance range D2 (step S6-9). Here, the predetermined distance range D2 extends from 500 m before the thick broken line start point S1 to 200 m beyond the thick broken line start point S1. In other words, when the length L of the thick broken line BL is equal to or greater than the predetermined length (300 m) and a vehicle acceleration section for converging with the main road R1 is comparatively long, the subject section of the convergence completion scene is set to be longer than that of a scene in which the length L of the thick broken line BL is comparatively short.

Having determined on the basis of the relative distance between the host vehicle position and the thick broken line start point S1 that the host vehicle position is within the predetermined distance range D2 (YES in the step S6-9), the convergence determination portion 3*b* switches the scene determination flag indicating the convergence completion scene ON (step S6-10).

When it is determined in the step S6-1 that the thick broken line BL is not present between the convergence road Rj and the main road R1 (NO in the step S6-1), the scene determination flag of the convergence completion scene is switched OFF (step S6-3). Further, when the host vehicle position is not within the predetermined distance range D1 in the step S6-6 (NO in the step S6-6) and the host vehicle position is not within the predetermined distance range D2 in the step S6-9 (NO in the step S6-9), the scene determination flag of the convergence completion scene is switched OFF (step S6-3).

Thus, when the host vehicle C is within the predetermined distance ranges D1, D2 based on the thick broken line start point S1, it is determined that the host vehicle C is located within the convergence completion scene, and therefore, the scene determination flag of the convergence completion scene stored in the memory is set to ON. When it is determined that the host vehicle C is not in the convergence completion scene, the scene determination flag of the convergence completion scene is switched OFF.

Figure 5:
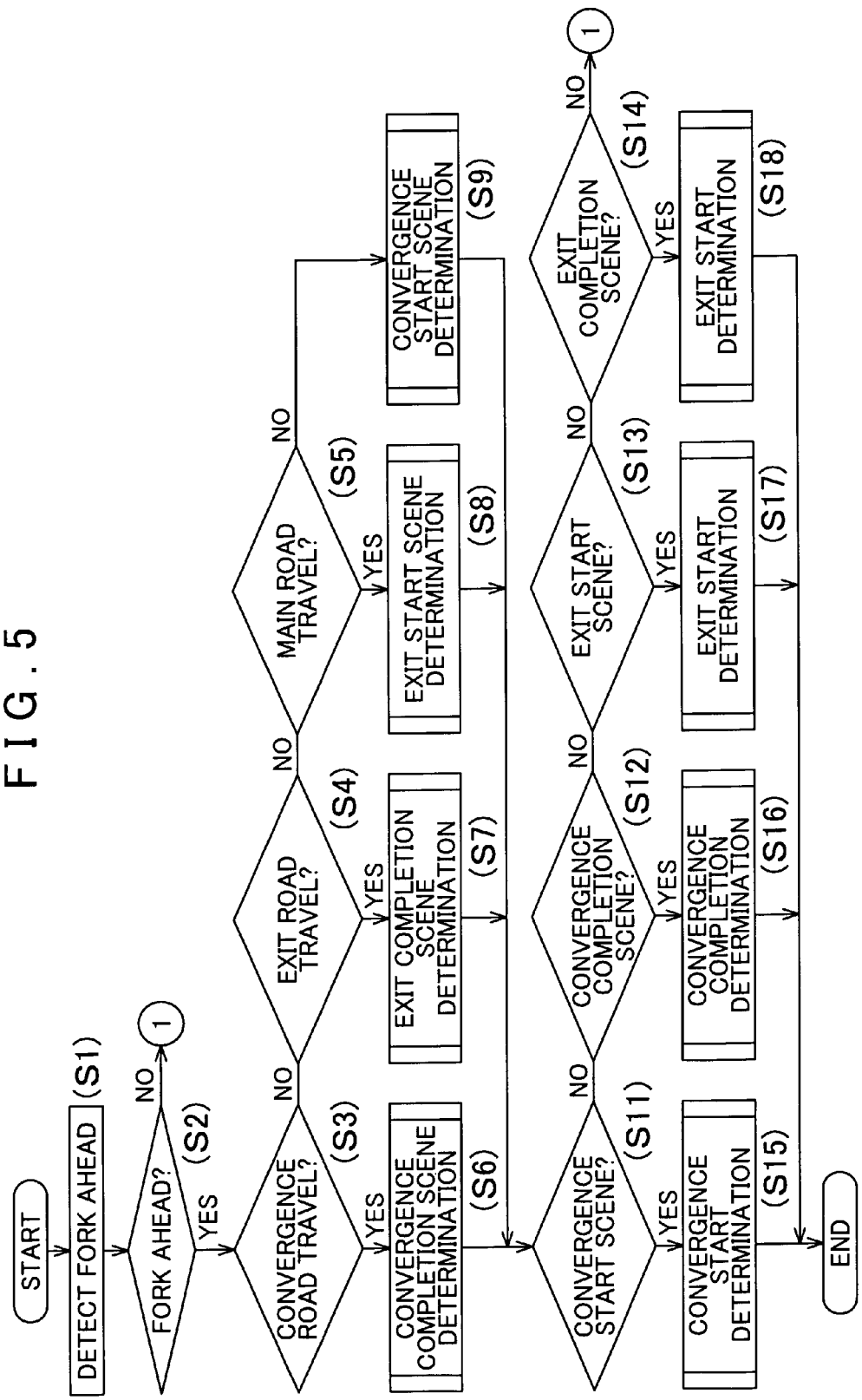
FIG. 5 is an illustrative view of a processing procedure of support timing determination processing.

Meanwhile, when the convergence determination portion 3*b* determines in the step S3 of the support timing determination processing shown in FIG. 5 that the host vehicle C is not traveling along a convergence road Rj connected to the main road R1 (NO in the step S3), the host vehicle position calculation portion 3*a* determines whether or not the host vehicle C is traveling along an exit road Rw serving as an access road (step S4).

At this time, the host vehicle position calculation portion 3*a* determines whether or not an exit road travel flag stored in a memory not shown in the drawings is ON. The exit road travel flag is a flag indicating whether or not the host vehicle C is traveling along the exit road Rw. When the host vehicle C is traveling along the exit road Rw, the exit road travel flag is ON, and at all other times, the flag is OFF.

When the exit road travel flag is OFF, the host vehicle position calculation portion 3*a* determines on the basis of the route data 6*a* or the link type of the map rendering data 6*b* whether or not the host vehicle position is located on an exit road Rw connected to the main road R1, as shown in FIGS. 17 and 18. The exit road Rw may be a connecting road Rw1 connected to a toll booth Tb, as shown in FIG. 17, or a side road Rw2 serving as an access road connected to an SA or a PA, as shown in FIG. 18.

Having determined that the host vehicle C has exited the main road R1 and is traveling along the exit road Rw (YES in the step S4), the exit determination portion 3*c* performs an exit completion scene determination (step S7). An exit completion scene is a state in which the host vehicle C completes an exit. The exit completion scene determination is processing performed in advance to detect, with a high degree of precision, the exit completion timing when the host vehicle C is traveling along the exit road Rw.

Exit Completion Scene Determination

Figure 7:
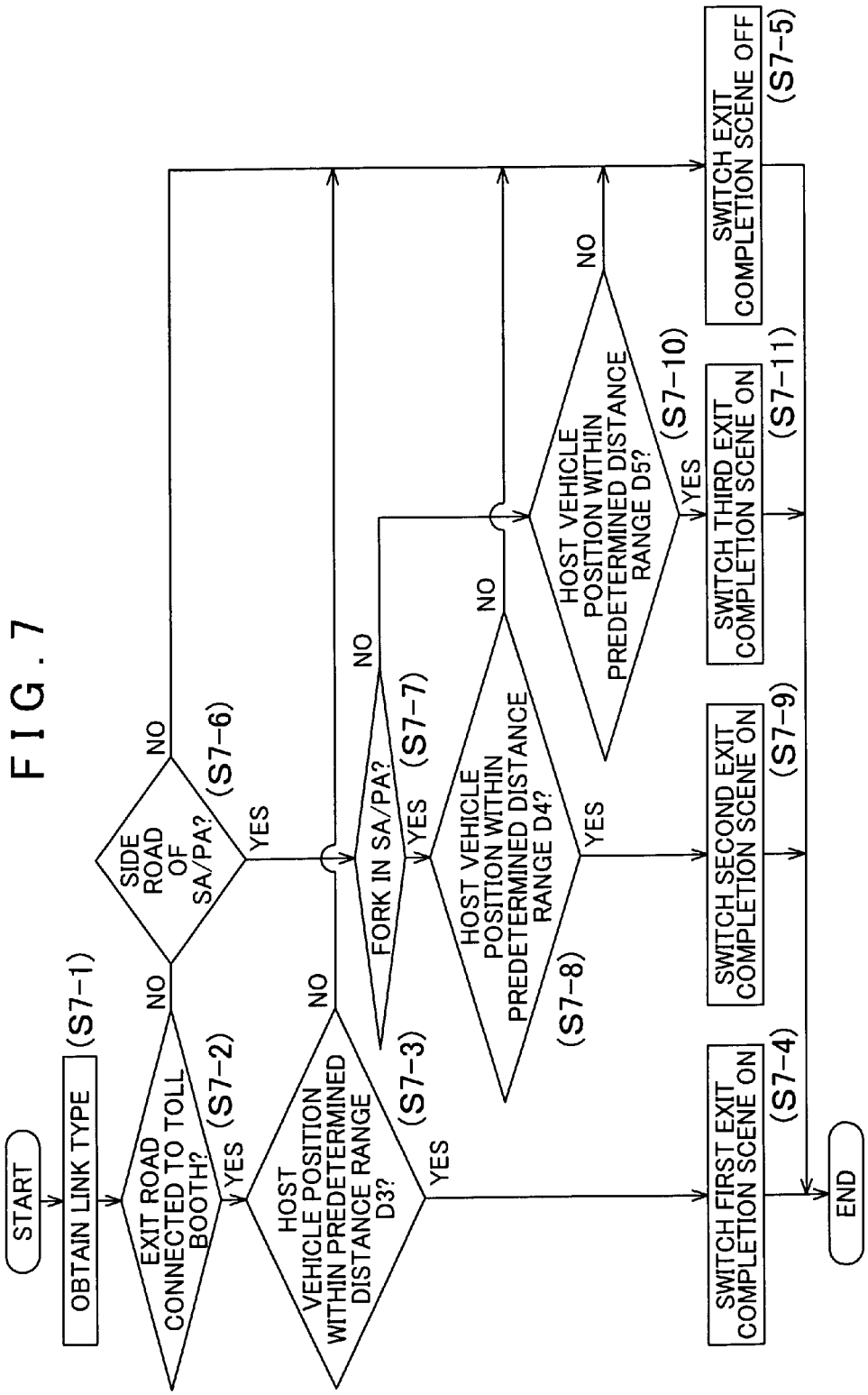
FIG. 7 is an illustrative view of a processing procedure of exit completion scene determination processing.

The exit completion scene determination will now be described in accordance with FIG. 7. First, the exit determination portion 3*c* obtains the link type of the link that corresponds to the current vehicle position from the route data 6*a* or the map rendering data 6*b* in the map DB 6 (step 7-1). The exit determination portion 3*c* then determines whether or not the obtained link type corresponds to an exit road connected to the toll booth Tb, as shown in FIG. 17 (step S7-2).

When the obtained link type corresponds to an exit road connected to the toll booth Tb, or in other words when the obtained link type corresponds to the connecting road Rw1 (YES in the step S7-2), the exit determination portion 3*c* determines whether or not the host vehicle position is included within a predetermined distance range D3 having the toll booth Tb as a reference (step S7-3). Here, as shown in FIG. 17, the predetermined distance range D3 extends from 500 m before the toll booth Tb to 100 m beyond the toll booth Tb.

When the host vehicle position is included within the predetermined distance range D3 (YES in the step S7-3), a scene determination flag of a first exit completion scene, which is stored in a storage portion of the exit determination portion 3*c*, not shown in the drawings, is switched ON (step S7-4).

On the other hand, after determining in the step S7-2 that the host vehicle position is not located on the connecting road Rw1 (NO in the step S7-2), the exit determination portion 3*c* determines whether or not the link type of the link corresponding to the host vehicle position corresponds to the side road Rw2 of an SA or a PA (step S7-6). When the link type is determined to correspond to the side road Rw2 (YES in the step S7-6), the procedure advances to a step S7-7.

In the step S7-7, the exit determination portion 3c determines whether or not a fork exists in the side road Rw2 of the SA or PA. The exit determination portion 3c determines the presence or absence of a fork node Nj indicating a fork on the basis of the route data 6a. Having determined that a fork exists in the side road Rw2 (YES in the step S7-7), as shown in FIG. 18, the exit determination portion 3c determines whether or not the host vehicle position is included in a predetermined distance range D4 having the fork node Nj as a reference (step S7-8). Here, the predetermined distance range D4 is set to extend from 500 m before the fork (the fork node Nj) to 100 m beyond the fork.

Having determined that the host vehicle position is included in the predetermined distance range D4 (YES in the step S7-8), the exit determination portion 3c switches a scene determination flag indicating a second exit completion scene, which is stored in the memory not shown in the drawings, ON (step S7-9).

Figure 19:
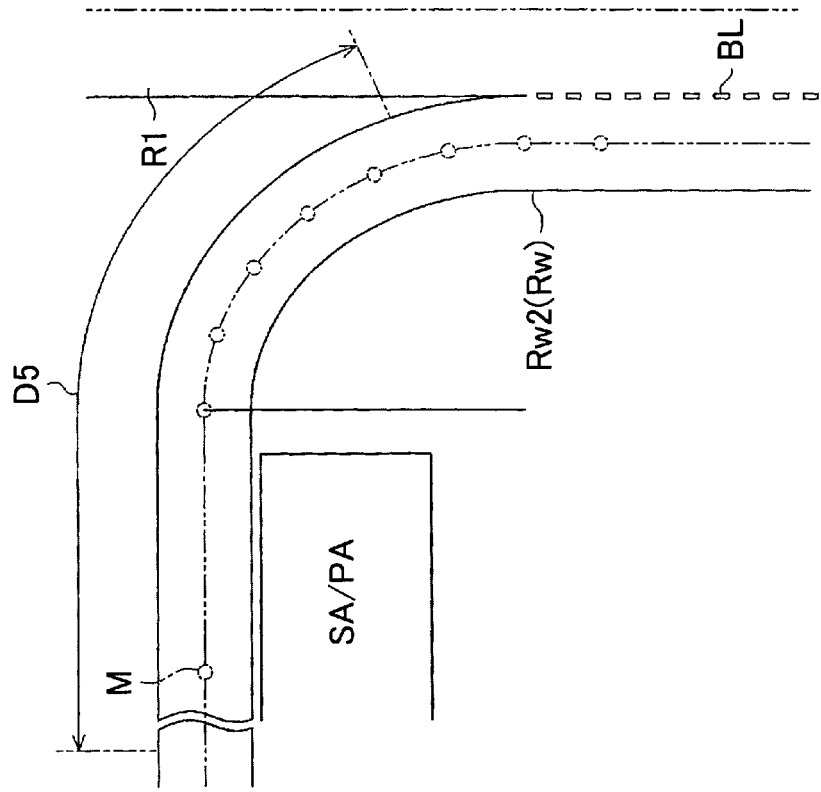
FIG. 19 is an illustrative view of a third exit completion scene.

On the other hand, when the exit determination portion 3c determines in the step S7-7 that a fork does not exist in the SA or PA (NO in the step S7-7), as shown in FIG. 19, the exit determination portion 3c determines whether or not the host vehicle position is included within a predetermined distance range D5 having an intermediate point M of the side road Rw2 as a reference (step S7-10). The intermediate point M is set at a midway point of the entire side road Rw2, and coordinates of the intermediate point M are stored in the lane information 7a in advance. Here, the predetermined distance range D5 is set to extend from 500 m before the intermediate point M to 100 m beyond the intermediate point M.

Having determined that the host vehicle position is included in the predetermined distance range D5 (YES in the step S7-10), the exit determination portion 3c switches a scene determination flag indicating a third exit completion scene ON (step S7-11).

When the host vehicle position is not included in the predetermined distance range D3 having the toll booth Tb as a reference in the step S7-3 (NO in the step S7-3), the procedure advances to a step S7-5, in which the flags respectively indicating the first to third exit completion scenes are switched OFF (step S7-5). Similarly, when it is determined that the host vehicle position is not included in the predetermined distance range D4 in the step S7-8 (NO in the step S7-8) and is not included in the predetermined distance range D5 (NO in the step S7-10), the procedure advances to the step S7-5, in which the flags respectively indicating the first to third exit completion scenes are switched OFF.

Hence, when the host vehicle position is within the predetermined distance ranges D3 to D5 based on the toll booth Tb, a fork in the side road Rw2 of the SA/PA, and the intermediate point of the side road Rw2, whereby the host vehicle C is in the first to third exit completion scenes, the scene determination flags respectively indicating the first to third exit completion scenes stored in the memory are switched ON. When the host vehicle C is in none of the exit completion scenes, the scene determination flags are switched OFF.

Meanwhile, when the host vehicle position calculation portion 3a determines in the step S4 of the support timing determination processing shown in FIG. 5 that the host vehicle C is not traveling along the exit road Rw (NO in the step S4), the procedure advances to a step S5, in which the host vehicle position calculation portion 3a determines whether or not the host vehicle C is traveling along the main road R1.

At this time, a determination is made as to whether or not a main road travel flag stored in the memory not shown in the drawings is ON, or whether or not the link type corresponding to the host vehicle position indicates the main road R1.

When the host vehicle position calculation portion 3 determines that the host vehicle C is traveling along the main road R1 (YES in the step S5), the exit determination portion 3c performs an exit start scene determination (step S8). The exit start scene is a state in which the host vehicle C starts to exit the main road R1 onto the exit road Rw. The exit start scene determination is executed to detect, with a high degree of precision, the exit start timing when the host vehicle C is traveling along the exit road Rw.

Exit Start Scene Determination

Figure 8:
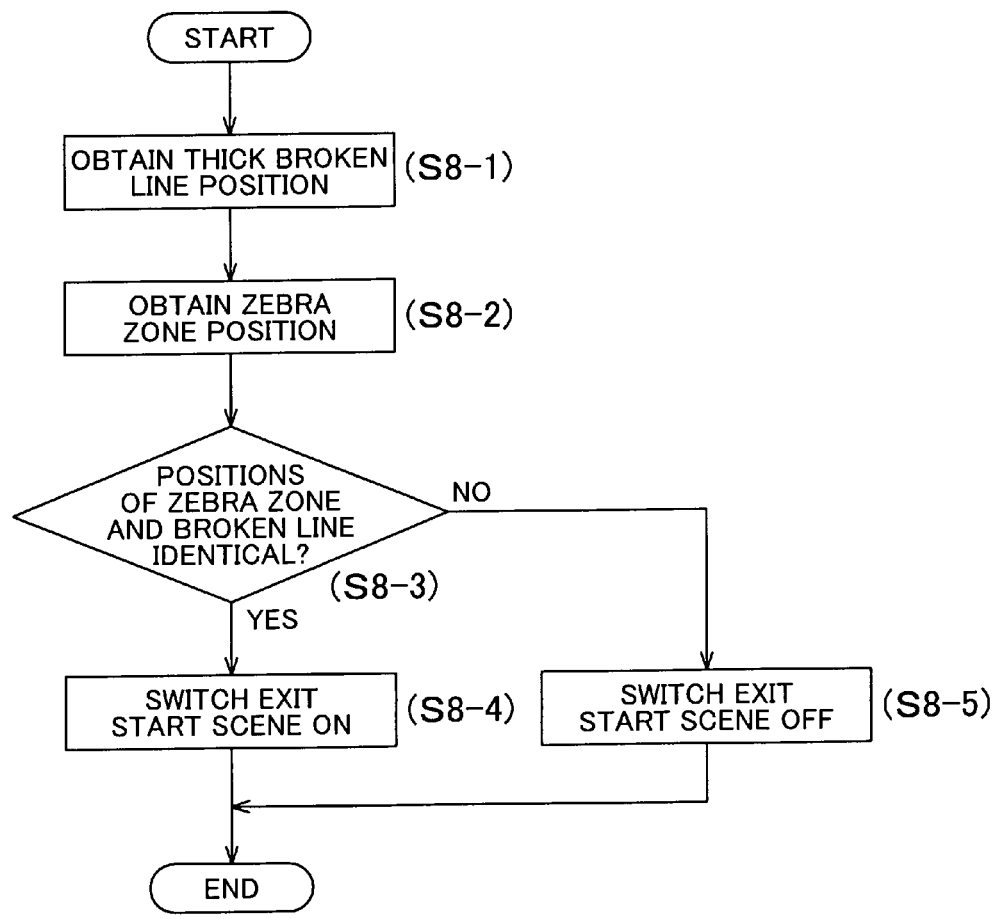
FIG. 8 is an illustrative view of a processing procedure of exit start scene determination processing.

The exit start scene will now be described in accordance with FIG. 8. First, the exit determination portion 3c obtains the position of the thick broken line BL separating the main road R1 from the exit road Rw in front of the host vehicle C on the basis of the lane information 7a in the lane information DB 7 (step S8-1). Further, the exit determination portion 3c obtains the position of a zebra zone Zb on the basis of the lane information 7a (step S8-2).

Having obtained the positions of the thick broken line BL and the zebra zone Zb, the exit determination portion 3c determines whether or not the positions of the thick broken line BL and the zebra zone Zb match each other in the advancement direction of the main road R1 (step S8-3).

Figure 20:
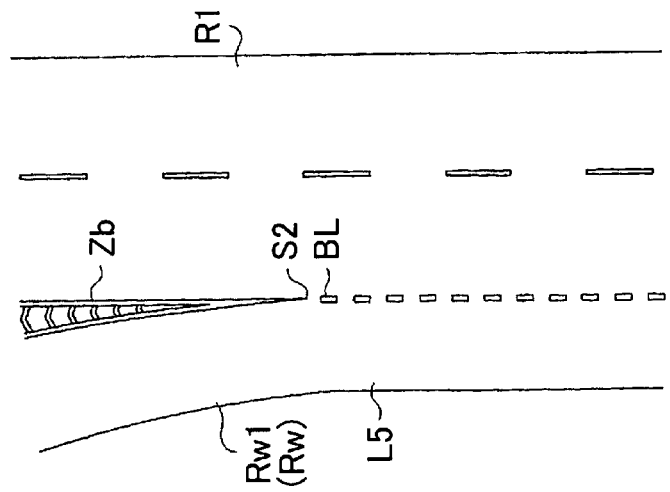
FIG. 20 is an illustrative view of an exit start scene.
Figure 21:
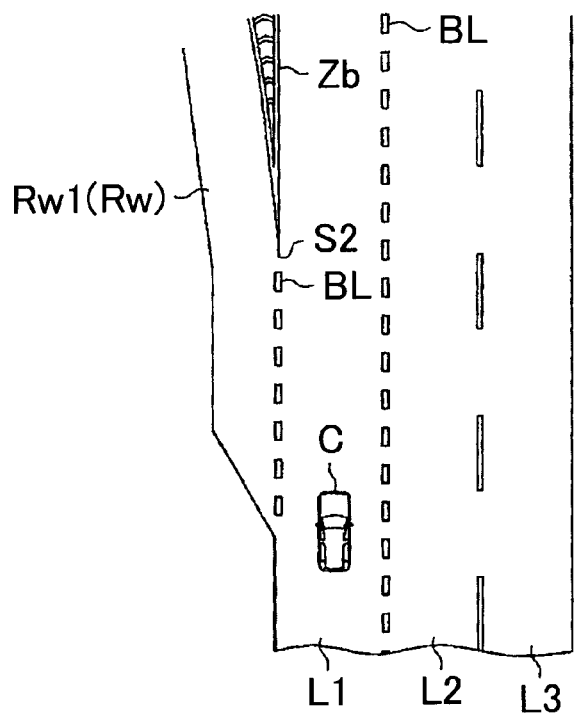
FIG. 21 is an illustrative view of another exit start scene.

When it is determined that the thick broken line BL and the zebra zone Zb match each other in the direction of the main road R1 (YES in the step S8-3), as shown in FIG. 20, the procedure advances to a step S8-4. When a plurality of thick broken lines BL are marked, as shown in FIG. 21, the thick broken line BL that separates the exit road Rw from the main road R1 is identified, and when the thick broken line BL and the zebra zone Zb are determined to match each other in the direction of the main road R1 (YES in the step S8-3), the procedure advances to the step S8-4.

In the step S8-4, a scene determination flag indicating the exit start scene is switched ON, whereupon the exit start scene determination is terminated.

Figure 22:
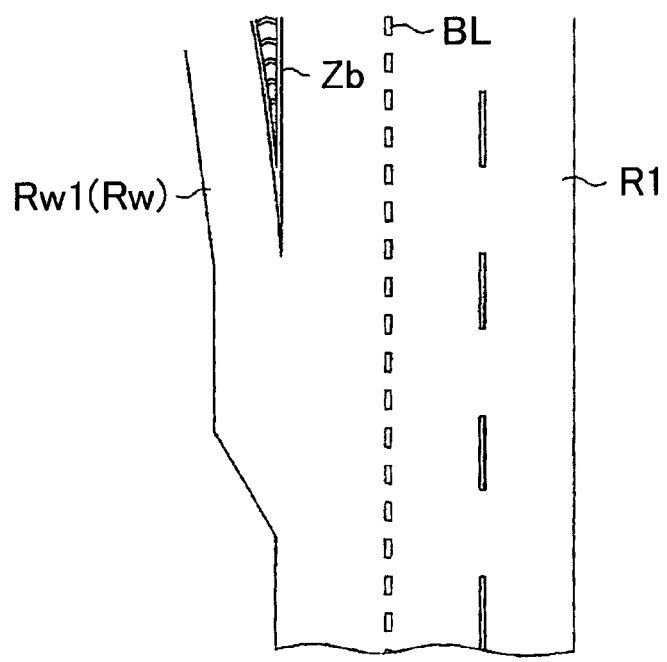
FIG. 22 is an illustrative view of a further exit start scene.

When a thick broken line BL separating the main road R1 from the exit road Rw does not exist, as shown in FIG. 22, it is determined that the positions of the thick broken line BL and the zebra zone Zb do not match (NO in the step S8-3). Hence, the scene determination flag indicating the exit start scene is switched OFF (step S8-5), whereupon the exit start scene determination is terminated.

Meanwhile, when the host vehicle position calculation portion 3a determines in the step S5 of the support timing determination processing shown in FIG. 5 that the host vehicle C is not traveling along the main road R1 (NO in the step S5), a convergence start scene determination is performed by the convergence determination portion (step S9). The convergence start scene is a state in which the host vehicle C begins to enter the main road R1 from the convergence road Rj, and the convergence start scene determination is executed to detect, with a high degree of precision, the convergence start timing when the host vehicle C is traveling along the convergence road Rj.

Convergence Start Scene Determination

Figure 9:
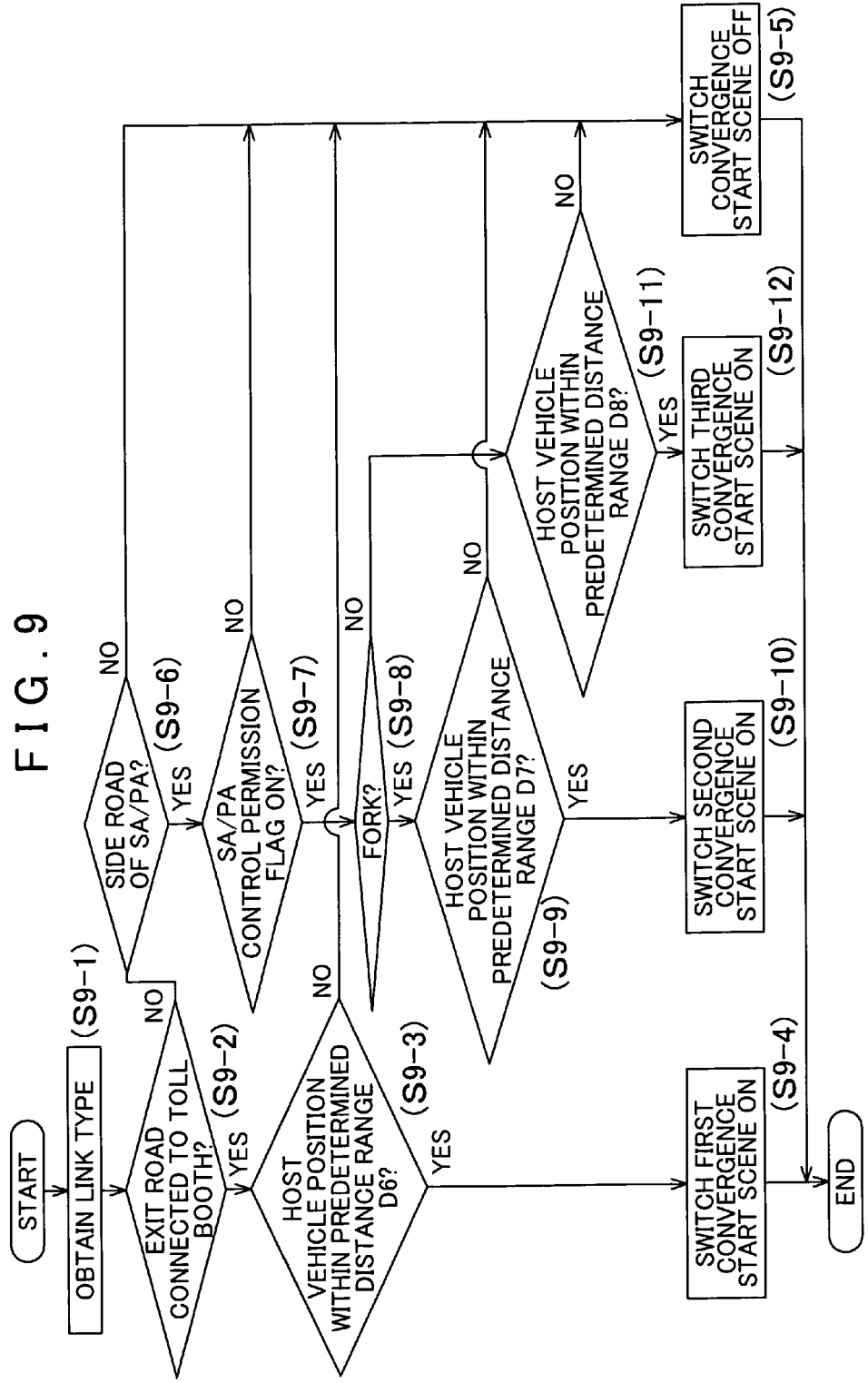
FIG. 9 is an illustrative view of a processing procedure of convergence start scene determination processing.

The convergence start scene determination will now be described in accordance with FIG. 9. First, the convergence determination portion 3b obtains the link type of the link corresponding to the current vehicle position from the route data 6a or the map rendering data 6b stored in the map DB 6 (step S9-1). The convergence determination portion 3b then determines whether or not the obtained link type indicates a convergence road Rj1 connecting the main road R1 to the toll booth Tb, such as that shown in FIG. 23 (step S9-2).

Figure 23:
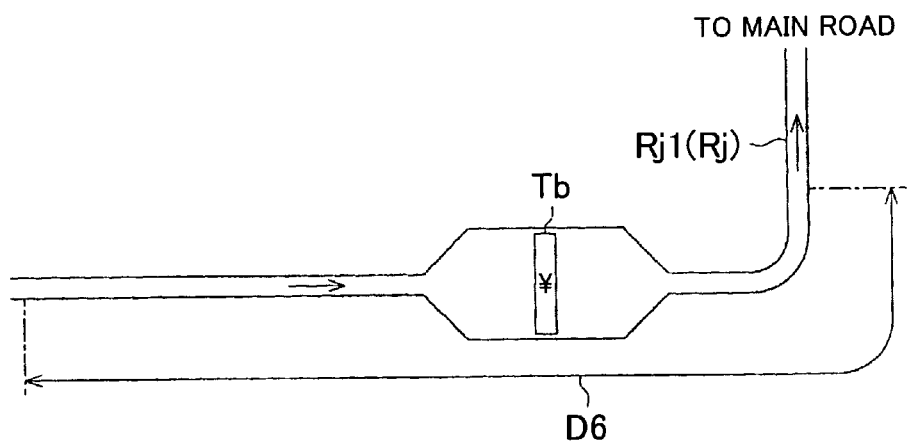
FIG. 23 is an illustrative view of a first convergence start scene.

Having determined that the obtained link type indicates a convergence road Rj1 connected to the toll booth Tb (YES in the step S9-2), the convergence determination portion 3b determines whether or not the host vehicle position is included in a predetermined distance range D6 having the toll booth Tb as a reference (step S9-3). As shown in FIG. 23, the predetermined distance range D6 extends from 500 m before the toll booth Tb to 50 m beyond the toll booth Tb.

When the host vehicle position is included in the predetermined distance range D6 (YES in the step S9-3), a scene determination flag indicating a first convergence start scene is switched ON (step S9-4). On the other hand, when it is determined in the step S9-2 that the host vehicle position is not located on the convergence road Rj1 (NO in the step S9-2), the convergence determination portion 3b determines whether or not the link type of the link corresponding to the host vehicle position denotes the side road Rj2 of an SA or a PA (step S9-6).

Figure 25:
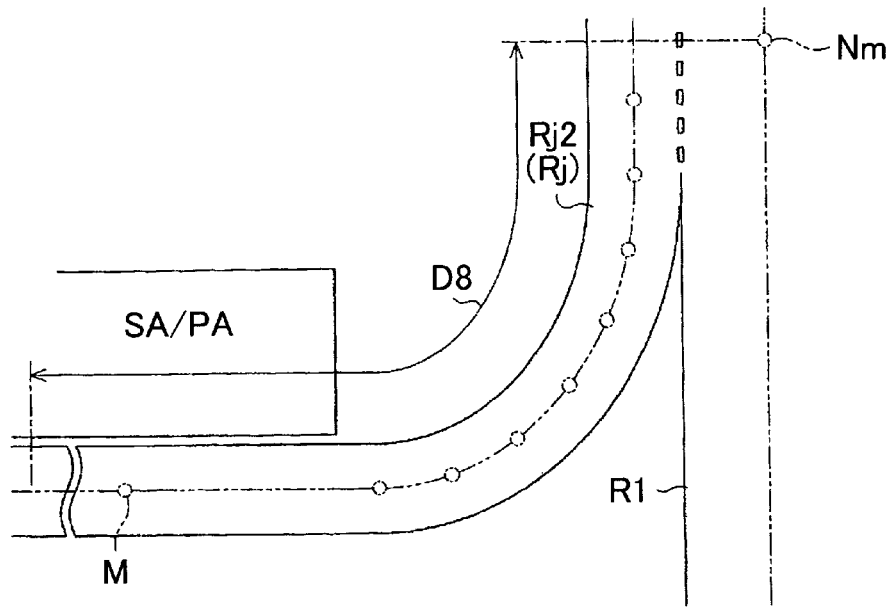
FIG. 25 is an illustrative view of a third convergence start scene.

When it is determined that the link type denotes the side road Rj2 of an SA or a PA, such as that shown in FIGS. 24 and 25 (YES in the step S9-6), the procedure advances to a step S9-7.

In the step S9-7, the exit determination portion 3c determines whether or not an SA/PA control permission flag stored in non-volatile memory of the convergence determination portion 3b, not shown in the drawings, is ON. The SA/PA control permission flag is switched ON when the host vehicle position calculation portion 3a determines that the host vehicle C has entered an SA/PA. For example, when the host vehicle C passes the entrance to the side road Rj2 after entering from the main road R1, the host vehicle position calculation portion 3a determines that the host vehicle C has entered an SA/PA, and the SA/PA control permission flag is switched ON. Further, when it is determined that the host vehicle C has exited the SA/PA, the SA/PA control permission flag is switched OFF. Hence, if the ignition module 40 is switched OFF while the SA/PA control permission flag is ON, the SA/PA control permission flag remains ON when the ignition module 40 is next switched ON, and therefore the host vehicle position calculation portion 3a can determine that the host vehicle C is in an SA or a PA.

When it is determined that the SA/PA control permission flag is ON, or in other words when it is determined that the host vehicle C is in an SA/PA (YES in the step S9-7), the procedure advances to a step S9-8.

In the step S9-8, the convergence determination portion 3b determines whether or not a fork such as that shown in FIG. 24 exists in the side road Rj2 of the SA/PA. The convergence determination portion 3b determines the presence or absence of a fork node Nj indicating the fork on the basis of the route data 6a.

When it is determined that the fork node Nj exists on the side road Rj2 (YES in the step S9-8), a determination is made as to whether or not the host vehicle position is included in a predetermined distance range D7 having the fork node Nj as a reference (step S9-9). Here, the predetermined distance range D7 is set to extend from 100 m before the fork (the fork node Nj serving as the fork) to a convergence point with the main road R1 (a convergence node Nm serving as the convergence point).

Having determined that the host vehicle position is included in the predetermined distance range D7 (YES in the step S9-9), the convergence determination portion 3b switches a scene determination flag indicating a second convergence start scene, which is stored in the memory not shown in the drawings, ON (step S9-10).

On the other hand, when it is determined in the step S9-8 that a fork does not exist in the SA or PA (NO in the step S9-8), as shown in FIG. 25, a determination is made as to whether or not the host vehicle position is included within a predetermined distance range D8 having an intermediate point M of the side road Rj2 as a reference (step S9-11). Here, the predetermined distance range D8 is set to extend from 100 m before the intermediate point M to the convergence point (the convergence node Nm).

Having determined that the host vehicle position is included in the predetermined distance range D8 (YES in the step S9-11), the convergence determination portion 3b switches a scene determination flag indicating a third convergence start scene ON (step S9-12).

When the host vehicle position is not included in the predetermined distance range D6 based on the toll booth Tb in the step S9-3 (NO in the step S9-3) and that the link type does not correspond to the side road Rj2 of an SA or a PA in the step S9-6 (NO in the step S9-6), the procedure advances to a step S9-5, in which the scene determination flags respectively indicating the first to third convergence start scenes are switched OFF.

Further, when it is determined in the step S9-7 that the SA/PA control permission flag is OFF (NO in the step S9-7), the host vehicle C is determined not to be in an SA/PA, even though the host vehicle position is located on the side road Rj2, and therefore the procedure advances to the step S9-5, in which the scene determination flags respectively indicating the first to third convergence start scenes are switched OFF.

Further, when it is determined that the host vehicle position is not included in the predetermined distance range D7 in the step S9-9 (NO in the step S9-9) and that the host vehicle position is not included in the predetermined distance range D8 (NO in the step S9-11), the procedure advances to the step S9-5, in which the scene determination flags respectively indicating the first to third convergence start scenes are switched OFF.

Hence, when it is determined that the host vehicle position is within the predetermined distance ranges D6 to D8 based on the toll booth Tb, a fork in the side road Rj2, and the intermediate point M of the side road Rj2, one of the scene determination flags respectively indicating the first to third convergence start scenes stored in the memory is switched ON. When the host vehicle C is in none of the convergence start scenes, the scene determination flags are switched OFF.

As a result of the respective scene determinations made in the steps S6 to S9, either one of the scene determination flags respectively indicating the first to third convergence start scenes, the convergence completion scene, the first to third exit completion scenes, and the exit start scene, which are stored in the memory not shown in the drawings, is switched ON, or all of the scene determination flags are switched OFF. On the basis of the scene determination flag that is switched ON, the navigation unit 3 determines one of the convergence start timing, the convergence completion timing, the exit start timing, and the exit completion timing (steps S11 to S14).

This processing will now be described in detail using the support timing determination processing flow shown in FIG. 5. First, in a step S11, the convergence determination portion 3b determines whether or not the flags respectively indicating the first to third convergence start scenes stored in the memory are ON. When it is determined that one of the flags respectively indicating the first to third convergence start scenes is ON (YES in the step S11), a convergence start determination is performed to detect the convergence start timing (step S15). In other words, when it is determined that the convergence start scene is ON, the convergence start timing alone is detected, and therefore the processing load can be reduced in comparison with a case in which determinations are made in accordance with all of the scenes, enabling an improvement in the timing detection precision.

Convergence Start Determination

Figure 10:
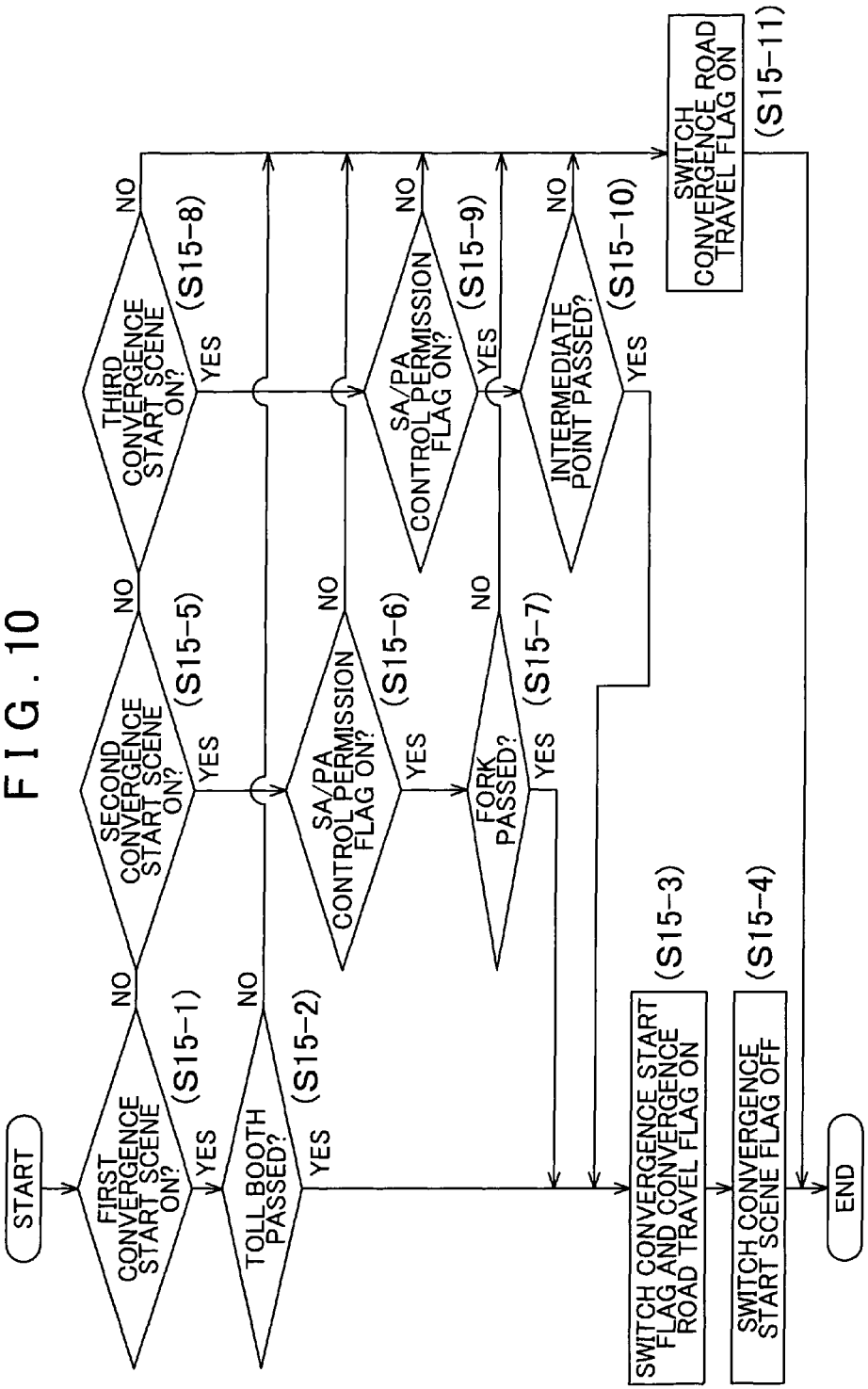
FIG. 10 is an illustrative view of a processing procedure of convergence start determination processing.

The convergence start determination processing will now be described in accordance with FIG. 10. First, the convergence determination portion 3b determines whether or not the scene determination flag indicating the first convergence start scene is ON (step S15-1). Having determined that the scene determination flag indicating the first convergence start scene is ON, or in other words that the host vehicle position is within the predetermined distance range D6 based on the toll booth Tb (from 500 m before the toll booth Tb to 50 m beyond the toll booth Tb, see FIG. 23) (YES in the step S15-1), the convergence determination portion 3b determines whether or not the host vehicle C has passed the toll booth Tb (step S15-2). When it is determined that the host vehicle C has passed the toll booth Tb (YES in the step S15-2), a convergence start flag and the convergence road travel flag are switched ON (step S15-3). The convergence start flag differs from the scene determination flags indicating the respective convergence start scenes in that it is switched ON for the first time when convergence is determined to have started. As described above, the convergence road travel flag indicates travel along a convergence road. When the convergence start flag and the convergence road travel flag are switched ON, the scene determination flag indicating the first convergence start scene is switched OFF (step S15-4).

On the other hand, when the convergence determination portion 3b determines in the step S15-1 that the scene determination flag indicating the first convergence start scene is OFF (NO in the step S15-1), the convergence determination portion 3b determines whether or not the scene determination flag indicating the second convergence start scene is ON (step S15-5). Having determined that the flag indicating the second convergence start scene is ON, or in other words that the host vehicle C is within the predetermined distance range D7 based on the fork of the SA or PA (from 100 m before the fork node Nj to the convergence node Nm) (YES in the step S15-5), as shown in FIG. 24, the convergence determination portion 3b determines whether or not the SA/PA control permission flag is ON (step S15-6). As described above, the SA/PA control permission flag is switched ON when the host vehicle position calculation portion 3a determines that the host vehicle C has entered an SA or a PA. When the SA/PA control permission flag is determined to be ON, or in other words when host vehicle C is determined to have already entered an SA or a PA (YES in the step S15-6), the procedure advances to a step S15-7. Note that when the SA/PA control permission flag is determined to be OFF (NO in the step S15-6), the convergence road travel flag is switched ON (step S15-11) and the convergence start determination is terminated, whereupon the procedure advances to the step S105 shown in FIG. 4. Here, the SA/PA control permission flag is switched ON and OFF to achieve an improvement in precision, but this determination processing may be omitted.

In the step S15-7, the convergence determination portion 3b determines whether or not the host vehicle C has passed the fork. When it is determined that the host vehicle C has passed the fork (the fork node Nj) (YES in the step S15-7), the convergence start flag and the convergence road travel flag are switched ON (step S15-3).

The scene determination flag of the second convergence start scene is then switched OFF (step S15-4).

Meanwhile, when the convergence determination portion 3b determines in the step S15-5 that the scene determination flag indicating the second convergence start scene is OFF (NO in the step S15-5), the convergence determination portion 3b determines whether or not the scene determination flag indicating the third convergence start scene is ON (step S15-8).

Having determined that the scene determination flag indicating the third convergence start scene is ON (YES in the step S15-8), the convergence determination portion 3b determines whether or not the SA/PA control permission flag is ON (step S15-9). When the SA/PA control permission flag is determined to be ON (YES in the step S15-9), the procedure advances to a step S15-10. When the SA/PA control permission flag is determined to be OFF (NO in the step S15-9), only the convergence road travel flag is switched ON (step S15-11), whereupon the procedure advances to the step S105.

When, in the step S15-10, the host vehicle C is in the third convergence start scene and the host vehicle position is included in the predetermined distance range D8 based on the intermediate point M of the side road Rj2 of an SA or a PA not having a fork (from 100 m before the intermediate point M to the convergence node Nm), as shown in FIG. 25, the convergence determination portion 3b determines whether or not the host vehicle C has passed the intermediate point M. When it is determined that the host vehicle C has passed the intermediate point M (YES in the step S15-10), the convergence start flag and convergence road travel flag are switched ON (step S15-3), whereupon the scene determination flag indicating the third convergence start scene is switched OFF (step S15-4).

Further, when it is determined in the step S15-2 that the host vehicle C has not passed the toll booth Tb (NO in the step S15-2), only the convergence road travel flag is switched ON (step S15-11), whereupon the convergence start determination is terminated. Further, when it is determined that the SA/PA control permission flag is not ON in the steps S15-6 and S15-9 (NO in the step S15-6), only the convergence road travel flag is switched ON (step S15-11), whereupon the convergence start determination is terminated.

Further, when it is determined that the flag of the third convergence start scene is OFF in the step S15-8 (NO in the step S15-8), that the host vehicle has not passed the fork (NO in the step S15-7), and that the host vehicle C has not passed the intermediate point (NO in the step S15-10), the convergence road travel flag is switched OFF (step S15-11). The procedure then advances to the step S105.

After leaving the convergence start flag ON for a predetermined time period (between 5 and 10 minutes or the like, for example), the convergence determination portion 3b resets the flag to its initial state, i.e. OFF. When the convergence start flag is switched ON again during the next convergence start determination, the convergence determination portion 3b returns the elapsed time to "0" and measures the elapsed time from that point.

Hence, by switching the convergence start flag ON when the host vehicle C passes the toll booth Tb, the fork, or the intermediate point M, the convergence start timing detected by the convergence determination portion 3b can be substantially matched to the timing at which the driver determines that convergence with the main road R1 has begun. Thus, the driver does not experience an unpleasant sensation when driving support is performed at this timing, and the support can be provided at an accurate timing.

Meanwhile, when the host vehicle C is not in the convergence start scene (NO in the step S11) in the step S11 of the support timing determination processing shown in FIG. 5, the convergence determination portion 3b determines whether or not the host vehicle C is in the convergence completion scene (step S12). More specifically, the convergence determination portion 3b checks the scene determination flags stored in the memory and determines whether or not the scene determination flag indicating the convergence completion scene is ON. When this scene determination flag is ON (YES in the step S12), or in other words when the host vehicle position is located within the predetermined distance ranges D1, D2 based on the thick broken line start point S1, a convergence completion determination is performed (step S16).

Convergence Completion Determination

Figure 11:
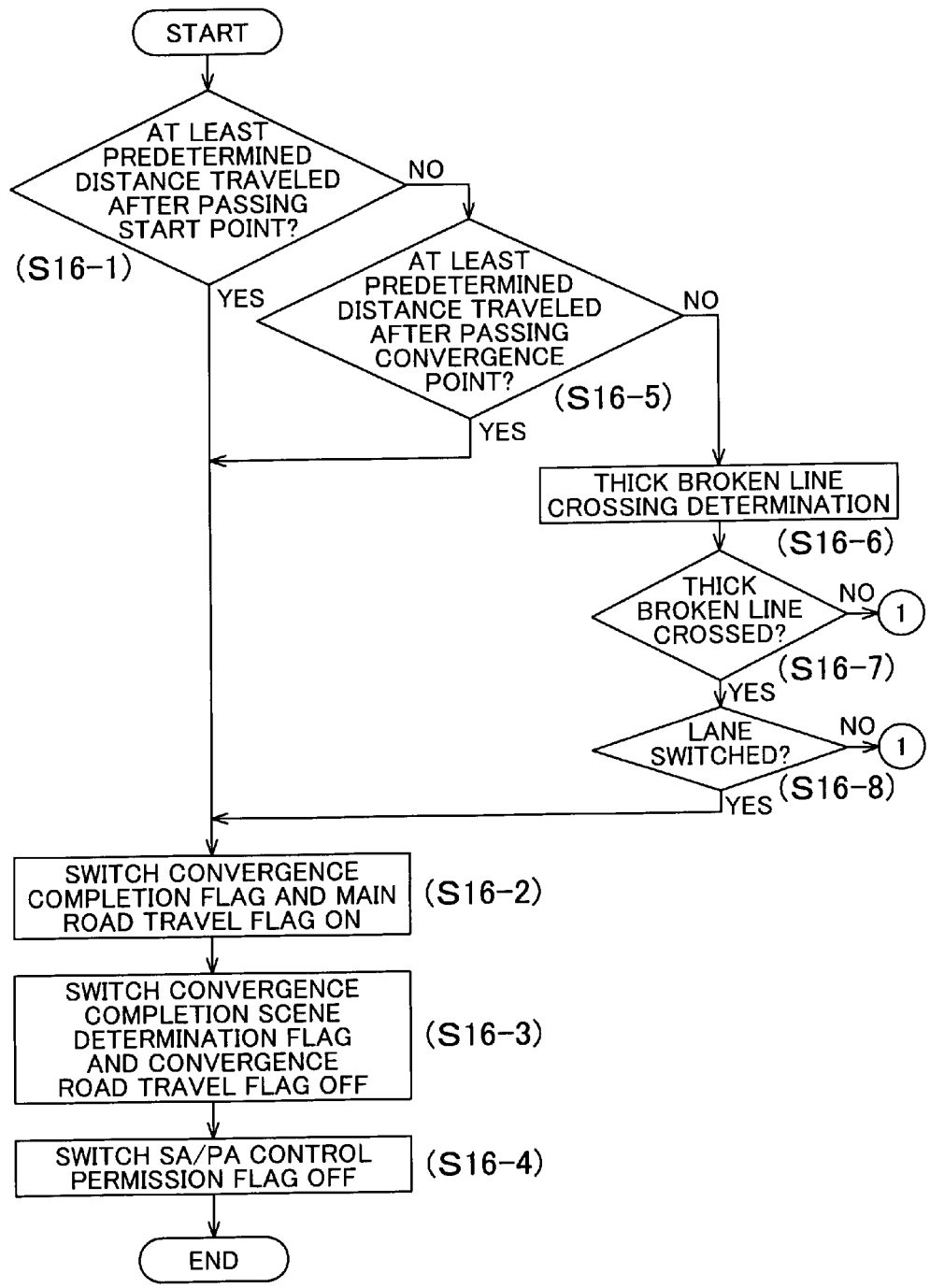
FIG. 11 is an illustrative view of a processing procedure of convergence completion determination processing.

The convergence completion determination processing will now be described in accordance with FIG. 11. First, the convergence determination portion 3b determines, on the basis of the host vehicle position obtained from the host vehicle position calculation portion 3a and the coordinates of the thick broken line start point S1 included in the lane information 7a, whether or not the host vehicle C has traveled at least a predetermined distance after passing the thick broken line start point S1 (see FIGS. 15 and 16) (step S16-1). Here, the predetermined distance is set at 100 m.

When it is determined that the host vehicle C has traveled at least the predetermined distance (100 m) after passing the thick broken line start point S1 (YES in the step S16-1), this indicates that the host vehicle C has substantially completed the acceleration required for convergence, and therefore a convergence completion flag and the main road travel flag are switched ON (step S16-2).

When it is determined that convergence is not complete after the host vehicle C has traveled at least the predetermined distance (100 m), or in other words when the convergence completion flag is not ON, convergence driving support is continued. For example, acceleration of the host vehicle C is continued. In another case, the host vehicle C may be traveling at low speed due to traffic congestion such that it cannot converge even after traveling at least the predetermined distance (100 m). In this case, it is determined that convergence is complete when the host vehicle C has traveled at least the predetermined distance (100 m). Further, the timing at which the driver determines that convergence is complete may be detected by employing a thick broken line BL that is actually seen by the driver as a reference.

After leaving the convergence completion flag ON for a predetermined time period, the convergence determination portion 3b resets the flag to its initial state, i.e. OFF. When the convergence completion flag is switched ON again during the next convergence completion determination, the convergence determination portion 3b returns the elapsed time to "0" and measures the elapsed time from that point.

Further, the convergence determination portion 3b switches the scene determination flag of the convergence completion scene and the convergence road travel flag OFF (step S16-3) and switches the SA/PA control permission flag OFF (step S16-4).

On the other hand, when it is determined that the host vehicle C has not traveled at least the predetermined distance (100 m) after passing the thick broken line start point S1 (NO in the step S16-1), or in other words that the host vehicle position is located before the thick broken line start point S1 or that the host vehicle C has passed the thick broken line start point S1 but has not traveled 100 m after passing the thick broken line start point S1, the procedure advances to a step S16-5.

In the step S16-5, the convergence determination portion 3b determines whether or not the host vehicle C has traveled at least a predetermined distance after passing the convergence point (the convergence node Nm, see FIG. 15). Here, the predetermined distance is set at 100 m. Hence, by determining the convergence completion timing repeatedly in accordance with the step S16-1, the timing is always detected.

When the convergence determination portion 3b determines in the step S16-5 that the host vehicle C has traveled at least the predetermined distance (100 m) after passing the convergence point (YES in the step S16-5), the convergence determination portion 3b switches the convergence completion flag and the main road travel flag ON (step S16-2). The convergence determination portion 3b also switches the scene determination flag of the convergence completion scene, the SA/PA control permission flag, and the convergence road travel flag OFF (steps S16-3 and S16-4).

When the convergence determination portion 3b determines in the step S16-5 that the host vehicle C has not traveled at least the predetermined distance (100 m) after passing the convergence point (NO in the step S16-5), the procedure advances to a step S16-6. In the step S16-6, the convergence determination portion 3b performs a thick broken line crossing determination for determining the position of the thick broken line BL relative to the host vehicle C on the basis of a determination made by the image processor 8.

Figure 26:
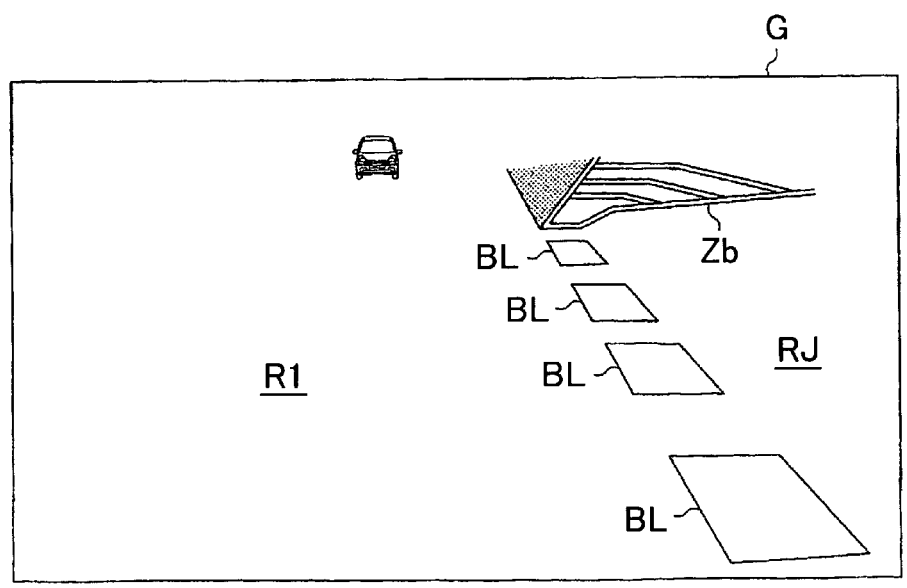
FIG. 26 is an illustrative view of a convergence completion determination.
Figure 27:
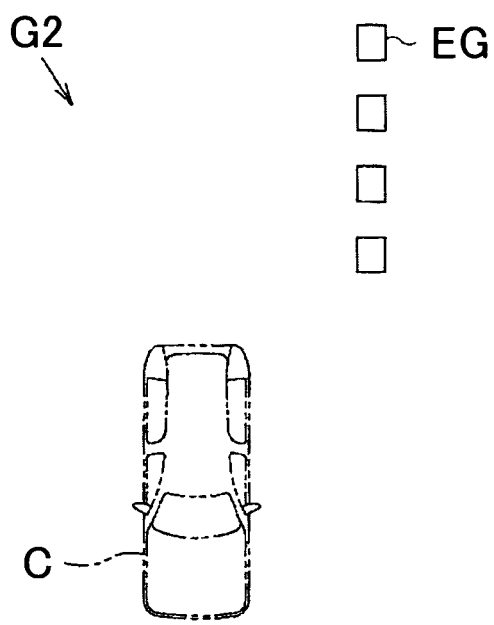
FIG. 27 is an illustrative view of another convergence completion determination.

For example, image data G such as those shown in FIG. 26 are input into the image processor 8 from the camera 30. These image data G depict the rear of the host vehicle C when the host vehicle C crosses the thick broken line BL. The image data G depict the thick broken line BL positioned on the right side of the host vehicle C as seen from the camera position. As described above, the image processor 8 performs edge point detection and the like on the image data G to detect an edge connecting edge points indicating the thick broken line BL. Further, the image processor 8 subjects the image data G including the detected edges to coordinate conversion to generate a bird's eye image G2 such as that shown in FIG. 27. The image processor 8 then determines whether an edge EG of the thick broken line BL is on the left side or the right side of the host vehicle C, shown by a dot-dot-dash line in the drawing, as seen from the camera position. When the host vehicle C is traveling on the left side such that convergence will occur from the left side of the main road R1 and it is determined that the edge EG of the thick broken line BL is located on the right side of the host vehicle C as seen from the camera position, the host vehicle C is determined to have crossed the thick broken line BL. When convergence is to occur from a convergence road Rj on the right side of the main road R1 and it is determined that the edge EG of the thick broken line BL is located on the left side of the host vehicle C as seen from the camera position, the host vehicle C is determined to have crossed the thick broken line BL. When the vehicle body of the host vehicle C and the edge EG overlap, or when the edge EG is on the right side of the host vehicle C, it is determined that the host vehicle C has not crossed the thick broken line BL.

The image processor 8 determines, on the basis of the thick broken line crossing determination (step S16-6), whether or not the host vehicle C has crossed the thick broken line BL (step S16-7). When it is determined that the host vehicle C has crossed the thick broken line BL (YES in the step S16-7), the host vehicle position calculation portion 3a determines whether or not the host vehicle C has moved to a lane of the main road R1 from the convergence road Rj (step S16-8). By determining lane movement as well as performing a determination through image processing, the determination as to whether or not the host vehicle C has crossed the thick broken line BL can be made more reliably.

When it is determined that the host vehicle C has switched lanes (YES in the step S16-8), the convergence completion flag and the main road travel flag are switched ON (step S16-2). Further, the scene determination flag of the convergence completion scene, the SA/PA control permission flag, and the convergence road travel flag are switched OFF (steps S16-3 and S16-4). By performing the convergence completion determination using image processing in this manner, the timing at which convergence completion is detected can be matched to the timing at which the driver determines that convergence is complete.

When it is determined that the host vehicle C has not switched lanes (NO in the step S16-8), the convergence completion determination is terminated and the procedure advances to the step S105 (see FIG. 4) without executing support. Further, when it is determined in the step S16-7 that the host vehicle C has not crossed the thick broken line BL (NO in the step S16-7), the procedure advances to the step S105 (see FIG. 4) without executing support.

Hence, when the convergence completion flag is switched ON, support corresponding to convergence completion can be executed at an accurate timing in the step S104 shown in FIG. 4. Further, by setting the point at which the convergence start flag switches ON to the point at which the convergence completion flag switches ON as a convergence section, support such as the provision of information and warnings, shift control, and so on can be executed while the host vehicle C travels through the convergence section.

Meanwhile, when it is determined that the host vehicle C is not in the convergence completion scene (NO in the step S12) in the step S12 of the support timing determination processing shown in FIG. 5, the convergence determination portion 3b determines whether or not the host vehicle C is in one of the first to third exit start scenes (step S13). The convergence determination portion 3b checks the scene determination flags stored in the memory and determines whether or not one of the scene determination flags indicating the first to third exit start scenes is ON. When one of these scene determination flags is ON (YES in the step S13), or in other words when a fork between an exit road Rw and the main road R1 is present in front of the host vehicle C and the positions of the thick broken line BL and the zebra zone Zb match, an exit start determination is performed (step S17).

Exit Start Determination

Figure 12:
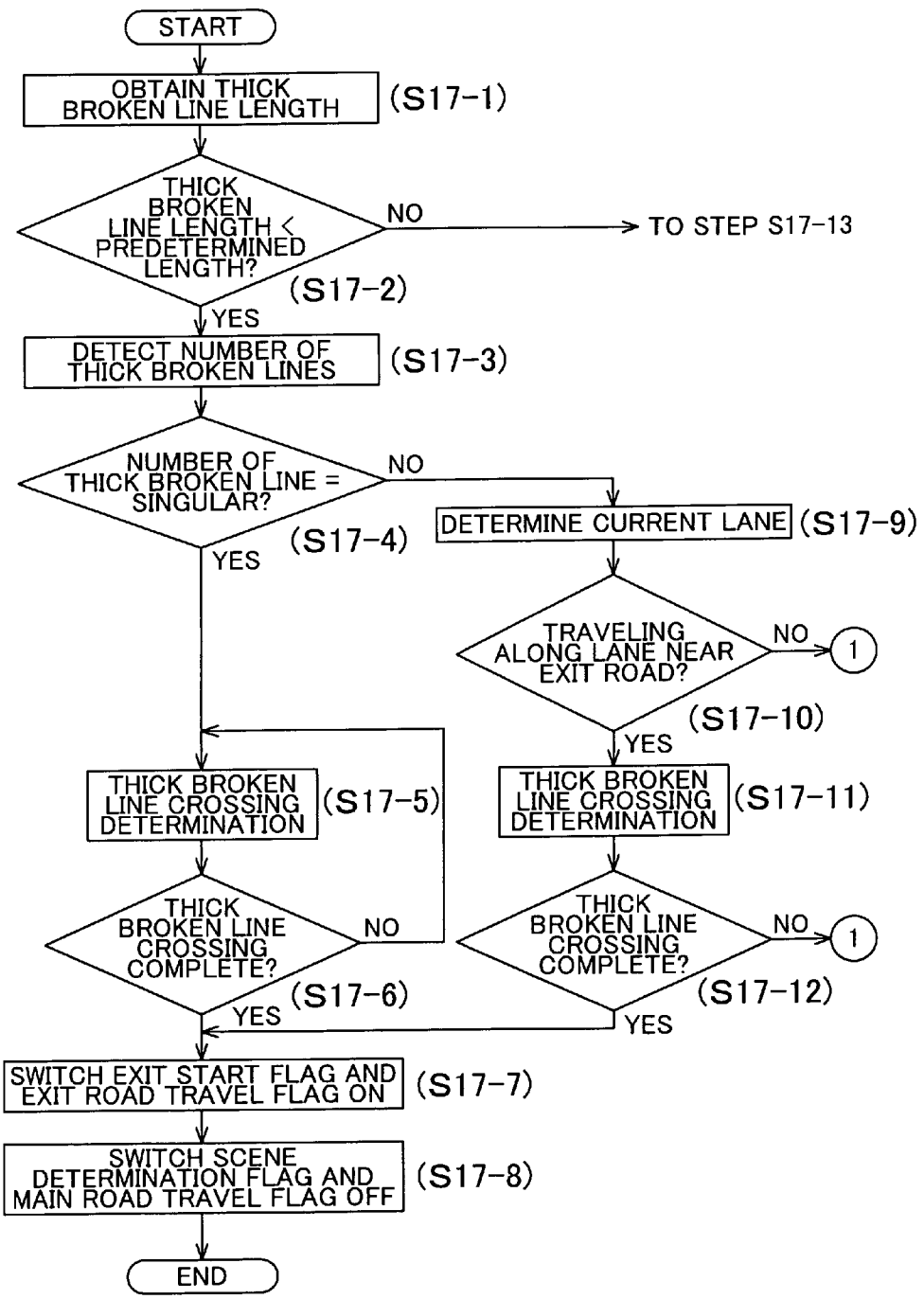
FIG. 12 is an illustrative view of a processing procedure of exit start determination processing.

The exit start determination will now be described in accordance with FIG. 12. The exit determination portion 3c obtains the length L of the thick broken line BL on the basis of the lane information 7a stored in the lane information DB 7 (step S17-1), and determines whether or not the length L of the thick broken line BL is shorter than a predetermined length (step S17-2). When it is determined that the length L of the thick broken line BL is shorter than the predetermined length (300 m) (YES in the step S17-2), the number of thick broken lines BL is detected (step S17-3).

For example, when only a thick broken line BL separating the main road R1 from the exit road Rw is marked, as shown in FIG. 20, the exit determination portion 3c determines that "one" thick broken line BL is present. In certain cases, however, a thick broken line BL dividing the lanes of the main road R1 may be marked in addition to the thick broken line BL separating the main road R1 from the exit road Rw, as shown in FIG. 21, and in these cases, the exit determination portion 3c determines that "two" thick broken lines BL are present. The exit determination portion 3c then determines in a step S17-4 whether or not the number of thick broken lines BL is singular. When the number of thick broken lines BL is singular (YES in the step S17-4), the procedure advances to a step S17-5. When the number of thick broken lines BL is plural (NO in the step S17-4), the procedure advances to a step S17-9.

In the step S17-5, the exit determination portion 3b cooperates with the image processor 8 to perform a thick broken line crossing determination in a similar manner to the step S16-6 described above. The exit determination portion 3b then determines whether or not the host vehicle C has crossed the thick broken line BL (step S17-6). For example, when the host vehicle C exits the main road R1 onto an exit road Rw that branches to the left side and the thick broken line BL (the edge EG) is on the left side of the host vehicle C as seen from the camera position, it is determined that the host vehicle C has crossed the thick broken line, and when the thick broken line BL is on the right side of the host vehicle C or under the host vehicle C as seen from the camera position, it is determined that the host vehicle C has not crossed the thick broken line BL.

When it is determined that the host vehicle C has crossed the thick broken line (YES in the step S17-6), the exit determination portion 3c switches an exit start flag and the exit road travel flag stored in the exit determination portion 3c ON (step S17-7). The exit determination portion 3c also switches the main road travel flag and the scene determination flag of the exit start scene OFF (step S17-8). Further, after the exit start flag has been ON for a predetermined time period, the exit determination portion 3c resets the flag to its initial state, i.e. OFF. Then, when the exit start flag is switched ON again in the next exit start determination, the exit determination portion 3c returns the elapsed time to "0" and measures the elapsed time from that point.

Situations in which the driver determines that an exit has begun when the host vehicle C crosses a thick broken line BL occur often, and therefore, by setting the timing at which the host vehicle C crosses the thick broken line BL as the exit start timing by means of image processing, the procedure can be aligned with the senses of the driver. Further, by determining that an exit has begun after the host vehicle C crosses the thick broken line BL, it is possible to ensure that deceleration does not occur before the host vehicle C enters the exit road Rw.

Meanwhile, in the step S17-9, the exit determination portion 3c determines the current lane on the basis of the host vehicle position calculation portion 3a, and then determines whether or not the host vehicle C is traveling on the lane near the exit road Rw (step S17-10). When the host vehicle position is located on a lane L1 adjacent to the exit road Rw, as shown in FIG. 21, it is determined in the step S17-10 that the host vehicle C is traveling on the lane near the exit road Rw (YES in the step S17-10), and therefore the procedure advances to a step S17-11. When the host vehicle position is located on lanes L2, L3, which are separated from the exit road Rw by the lane L1, rather than the lane L1 adjacent to the exit road Rw, it is determined that the host vehicle C is not traveling on the lane near the exit road Rw (NO in the step S17-10), and therefore the exit start determination is terminated, whereupon the procedure advances to the step S105 (see FIG. 4) without executing support.

In the step S17-11, the thick broken line crossing determination described above is performed. Next, a determination is made as to whether or not the host vehicle C has crossed the thick broken line BL (step S17-12). When the host vehicle C has not crossed the thick broken line BL (NO in the step S17-12), the procedure advances to the step S105 (see FIG. 4) without executing support. When it is determined that the host vehicle C has crossed the thick broken line BL (YES in the step S17-12), the exit start flag and exit road travel flag stored in the exit determination portion 3c are switched ON (step S17-7). Further, the main road travel flag and the scene determination flag of the exit start scene are switched OFF (step S17-8).

Figure 13:
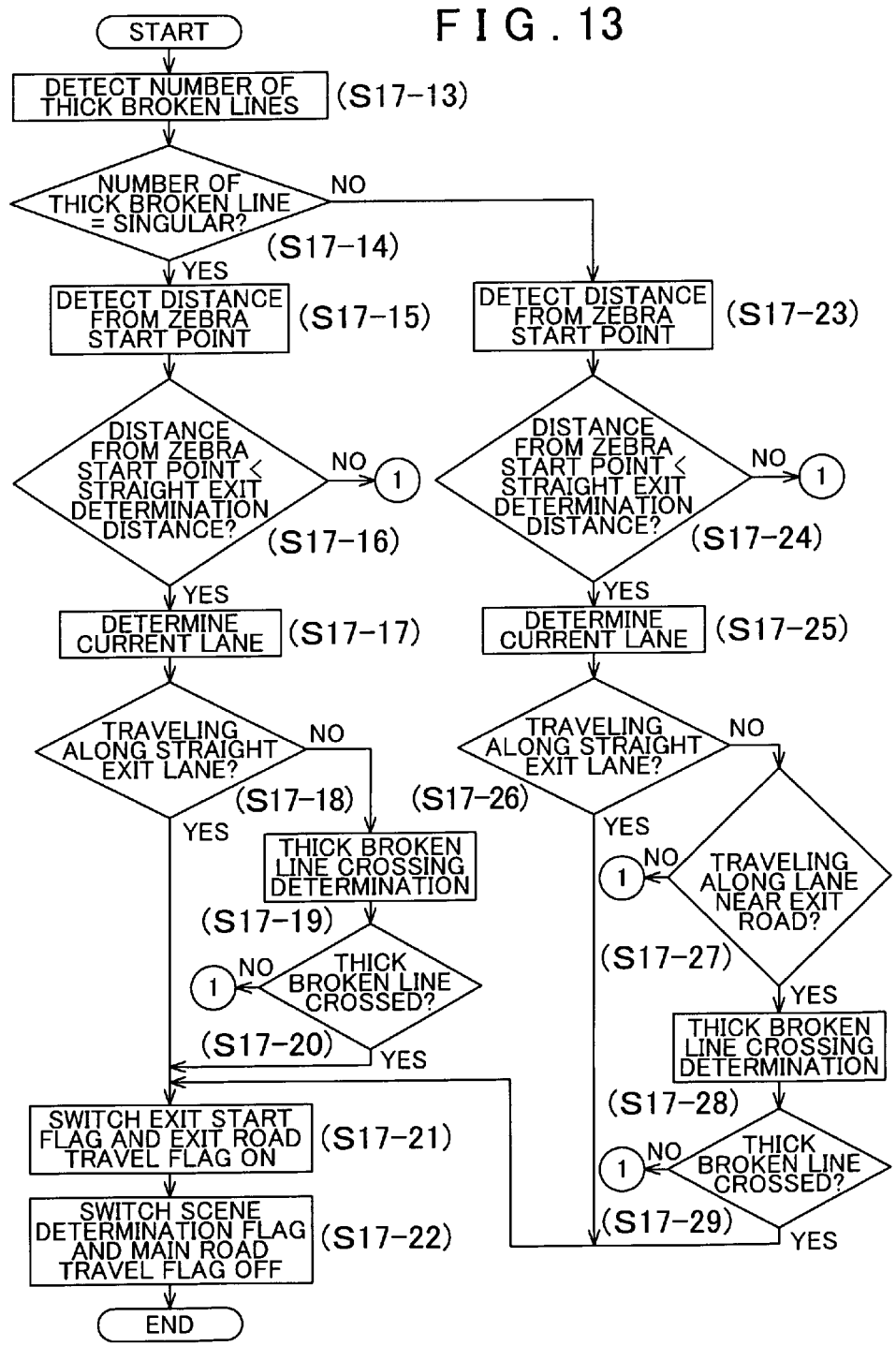
FIG. 13 is an illustrative view of a processing procedure of the exit start determination processing subsequent to FIG. 12.

When the total length of the thick broken line BL is equal to or greater than the predetermined length (300 m) in the step S17-2 (NO in the step S17-2), on the other hand, the procedure advances to a step S17-13 shown in FIG. 13. In other words, when the total length of the thick broken line BL is equal to or greater than the predetermined length, the host vehicle C may exit straight onto the exit road Rw, and therefore processing is performed while taking a straight exit into account.

First, in the step S17-13, the exit determination portion 3c detects the number of thick broken lines BL marked on the road ahead on the basis of the lane information 7a. The exit determination portion 3c then determines whether or not the number of thick broken lines BL is singular (step S17-14). When the number of thick broken lines BL is singular (YES in the step S17-14), the exit determination portion 3c obtains a distance from the start point S2 of the zebra zone Zb marked between the main road R1 and the exit road Rw to the host vehicle position on the basis of the lane information 7a (step S17-15).

After obtaining the distance from the start point S2 to the host vehicle position, the exit determination portion 3c determines whether or not the obtained distance is smaller than a predetermined straight exit determination distance (step S17-16). Here, a "straight exit" indicates a situation in which a traveling lane L5 connected to the exit road Rw exists as a part of the main road R1 as shown in FIG. 20, and by traveling straight along the traveling lane L5, the host vehicle C enters the exit road Rw without crossing the thick broken line BL. Further, the "straight exit determination distance" is a distance for determining whether or not the host vehicle C has performed a straight exit while traveling along the travel lane L5. In this embodiment, a determination is made as to whether or not a relative distance between the host vehicle position and the start point S2 of the zebra zone Zb, or in other words the remaining exit section, is less than 100 m.

When it is determined that the distance from the start point S2 to the host vehicle position is equal to or greater than the predetermined straight exit determination distance (NO in the step S17-16), the exit start determination is terminated and the procedure advances to the step S105. When it is determined that the distance from the start point S2 to the host vehicle position is smaller than the predetermined straight exit determination distance (YES in the step S17-16), it is determined that the remaining exit section is short, and therefore the procedure advances to a step S17-17.

In the step S17-17, the host vehicle position calculation portion 3a determines the current lane of the host vehicle C (step S17-17). Next, a determination is made as to whether or not the host vehicle C is traveling along the travel lane L5 connected to the exit road Rw, on which a straight exit to the exit road Rw can be made (step S17-18). At this time, the exit determination portion 3c may determine that the host vehicle C is traveling along the straight exit travel lane on the basis of the host vehicle position and the lane information 7a. Alternatively, the image data G may be obtained from the camera 30 and the side of the host vehicle C on which the thick broken line BL is located may be determined by the image processor 8.

When it is determined that the host vehicle C is not traveling along the straight exit travel lane L5 (NO in the step S17-18), the thick broken line crossing determination described above is performed (step S17-19) and a determination is made as to whether or not the host vehicle C has crossed the thick broken line BL indicating the exit section (step S17-20). When the host vehicle C has not crossed the thick broken line BL indicating the exit section (NO in the step S17-20), the exit start determination is terminated and the procedure advances to the step S105. When it is determined that the host vehicle C has crossed the thick broken line BL (YES in the step S17-20), the exit start flag and exit road travel flag stored in the exit determination portion 3c are switched ON (step S17-21). Further, the main road travel flag and the scene determination flag of the exit start scene are switched OFF (step S17-22).

Meanwhile, when it is determined in the step S17-14 that the number of thick broken lines BL is plural (NO in the step S17-14), the exit determination portion 3c detects the distance from the start point S2 of the zebra zone Zb to the host vehicle position on the basis of the lane information 7a (step S17-23), similarly to the step S17-15. Next, similarly to the step S17-16, the exit determination portion 3c determines whether or not the obtained distance is smaller than the predetermined straight exit determination distance (100 m) (step S17-24).

When the distance from the start point S2 to the host vehicle position is determined to be equal to or greater than the predetermined straight exit determination distance (100 m) (NO in the step S17-24), the exit start determination is terminated and the procedure advances to the step S105. When the distance from the start point S2 to the host vehicle position is determined to be smaller than the predetermined straight exit determination distance (YES in the step S17-24), the current lane is determined (step S17-25). A determination is then made as to whether or not the host vehicle C is traveling on the travel lane L5 connected to the exit road Rw on which a straight exit can be made (step S17-26).

When it is determined that the host vehicle C is traveling on the travel lane L5 connected to the exit road Rw on which a straight exit can be made (YES in the step S17-26), the exit start flag and the exit road travel flag stored in the exit determination portion 3c are switched ON (step S17-21). The main road travel flag and the scene determination flag of the exit start scene are then switched OFF (step S17-22).

On the other hand, when it is determined that the host vehicle C is not traveling on the travel lane L5 connected to the exit road Rw on which a straight exit can be made (NO in the step S17-26), a determination is made on the basis of the host vehicle position, the lane information 7a, and so on as to whether or not the host vehicle C is traveling on the lane near the exit road Rw (step S17-27). When it is determined that the host vehicle C is traveling on the lane near the exit road Rw (YES in the step S17-27), the procedure advances to a step S17-28. When it is determined that the host vehicle C is not traveling on the lane near the exit road Rw (NO in the step S17-27), the procedure advances to the step S105.

In the step S17-28, the thick broken line crossing determination is made, whereupon a determination is made as to whether or not the host vehicle C has crossed the thick broken line BL (step S17-29). When it is determined that the host vehicle C has not crossed the thick broken line BL (NO in the step S17-29), the procedure advances to the step S105. When it is determined that the host vehicle C has crossed the thick broken line BL (YES in the step S17-29), the exit start flag and the exit road travel flag stored in the exit determination portion 3c are switched ON (step S17-21), and then the main road travel flag and the scene determination flag of the exit start scene are switched OFF (step S17-22).

Meanwhile, when it is determined that the host vehicle C is not in the exit start scene (NO in the step S13) in the step S13 shown in FIG. 5, a determination is made as to whether or not the host vehicle C is in any of the first to third exit completion scenes (step S14). When all of the scene determination flags respectively indicating the first to third exit completion scenes are OFF, or in other words when all of the scene determination flags are OFF (NO in the step S14), the procedure advances to the step S105 shown in FIG. 4 since none of the scene determination flags are ON. When one of the scene determination flags respectively indicating the first to third exit completion scenes is determined to be ON (YES in the step S14), an exit completion determination is performed (step S18).

Exit Completion Determination

Figure 14:
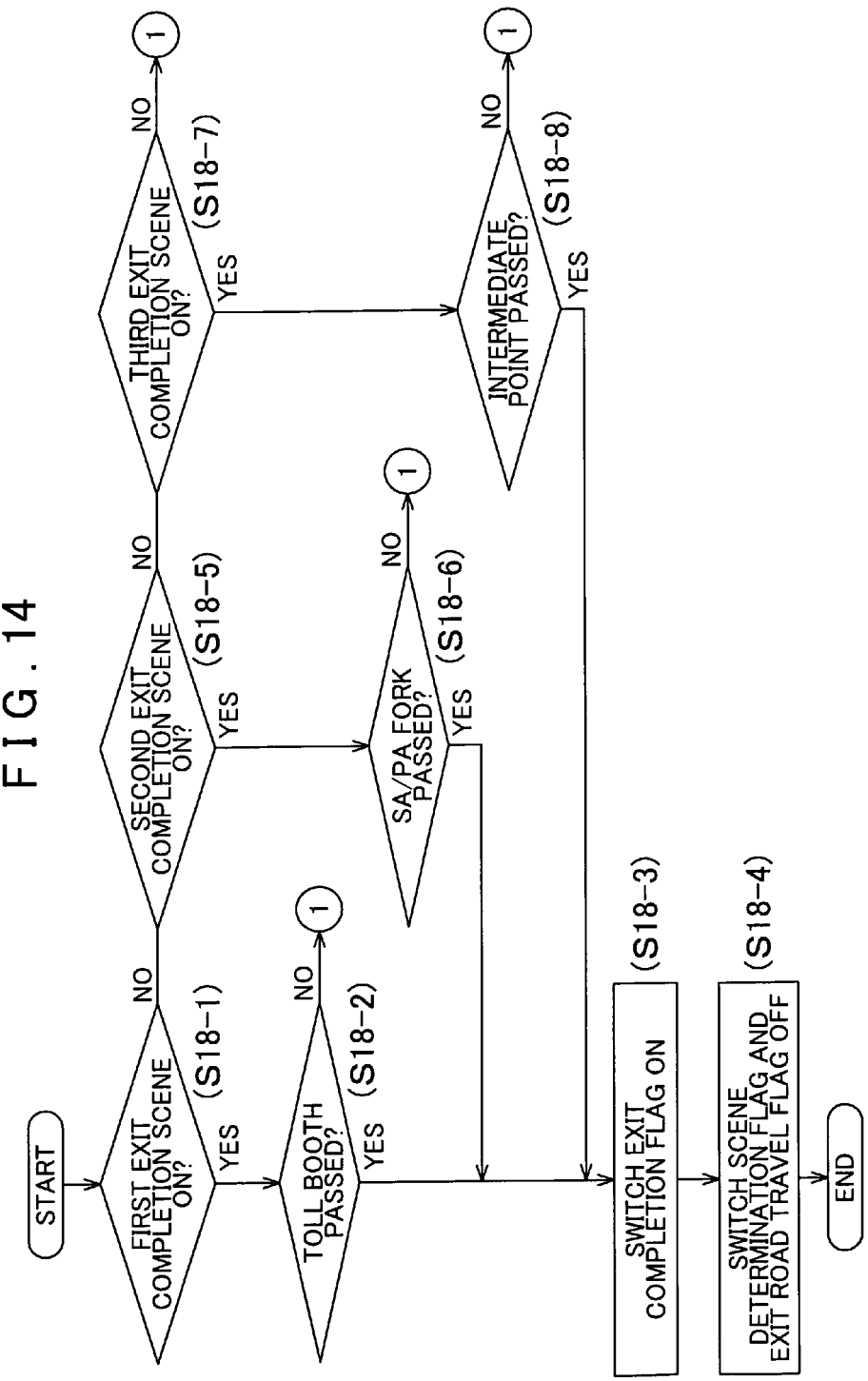
FIG. 14 is an illustrative view of a processing procedure of exit completion determination processing.

The exit completion determination will now be described in accordance with FIG. 14. First, the exit determination portion 3c determines whether or not the flag of the first exit completion scene is ON (step S18-1). Having determined that the flag indicating the first exit completion scene is ON, or in other words that the host vehicle position is within the predetermined distance range D3 based on the toll booth Tb (from 500 m before the toll booth Tb to 100 m beyond of the toll booth Tb) (YES in the step S18-1), the exit determination portion 3c determines whether or not the host vehicle C has passed the toll booth Tb (step S18-2). When the host vehicle C is determined to have passed the toll booth Tb (YES in the step S18-2), an exit completion flag is switched ON (step S18-3). The exit completion flag differs from the scene determination flags respectively indicating the first to third exit completion scenes in that it is switched ON for the first time at the point where exit completion is determined. Next, the scene determination flag indicating the first exit completion scene and the exit road travel flag are switched OFF (step S18-4).

When it is determined in the step S18-2 that the host vehicle C has not passed the toll booth Tb (NO in the step S18-2), on the other hand, the exit completion determination is terminated and the procedure advances to the step S105.

Further, when it is determined in the step S18-1 that the scene determination flag indicating the first exit completion scene is OFF (NO in the step S18-1), a determination is made as to whether or not the scene determination flag indicating the second exit completion scene is ON (step S18-5). When the scene determination flag indicating the second exit completion scene is ON, or in other words when the host vehicle position is included within the predetermined distance range D4 based on the fork node Nj (from 500 m before the fork node Nj to 100 m beyond the fork node Nj) (YES in the step S18-5), as shown in FIG. 18, the procedure advances to a step S18-6.

In the step S18-6, a determination is made as to whether or not the host vehicle C has passed the fork of the SA or PA. When it is determined that the host vehicle C has passed the fork (the fork node Nj) (YES in the step S18-6), the exit completion flag is switched ON (step S18-3). The scene determination flag indicating the exit completion scene and the exit road travel flag are then switched OFF (step S18-4).

When, on the other hand, it is determined in the step S18-5 that the scene determination flag indicating the second exit completion scene is OFF (NO in the step S18-5), a determination is made as to whether or not the scene determination flag indicating the third exit completion scene is ON (step S18-7). When it is determined here that the scene determination flag indicating the third exit completion scene is OFF (NO in the step S18-7), the exit completion determination is terminated and the procedure advances to the step S105.

When it is determined that the scene determination flag indicating the third exit completion scene is ON, or in other words when the host vehicle position is included within the predetermined distance range D5 based on the intermediate point M of the side road Rw2 not having a fork (from 500 m before the intermediate point M to 100 m beyond the intermediate point M), as shown in FIG. 19, the exit determination portion 3c determines whether or not the host vehicle C has passed the intermediate point M (step S18-8). When it is determined that the host vehicle C has passed the intermediate point M (YES in the step S18-8), the exit completion flag is switched ON (step S18-3). The scene determination flag indicating the third exit completion scene and the exit road travel flag are then switched OFF (step S18-4). When it is determined that the host vehicle C has not passed the intermediate point M (NO in the step S18-8), the exit completion determination is terminated and the procedure advances to the step S105.

Hence, when any one of the scene determination flags respectively indicating the first to third exit completion scenes is ON and the host vehicle C has passed the toll booth Tb, the fork, or the intermediate point M, it is determined that the exit is complete, and thus the timing at which exit completion is detected can be matched to the timing at which the driver determines that the exit is complete.

When the determination processing of the steps S15 to S18 shown in FIG. 5 is complete, the support control portion 3d of the navigation unit 3 determines whether or not the support timing has arrived in the manner described above (step S103 in FIG. 4). For example, when the exit start flag is ON, the support control portion 3d determines that the support timing has arrived and outputs a control signal to the voice processor 12, the image processor 8, or another unit such that information or a warning relating to the start of an exit is provided (step S104). Alternatively, the support control portion 3d outputs a control signal to the ECU 45 to execute deceleration processing. When driving support such as information provision or operation support has been executed, a determination is made in the step S105 as to whether or not the support is complete. When the support is not complete (NO in the step S105), the processing described above is repeated. When the support is complete (YES in the step S105), the support processing is terminated and the apparatus waits for the resumption of driving support.

According to the embodiment described above, the following effects can be obtained.

(1) The support control unit 2 determines the convergence start scene or the convergence completion scene in advance and determines the timing of the start of convergence or convergence completion in accordance with the respective scenes. Therefore, driving support corresponding to the start of convergence or convergence completion can be executed on the basis of the detected convergence start timing or convergence completion timing in accordance with the timing at which the driver senses that convergence has started or convergence is complete. As a result, driving support can be performed such that the driver does not experience an unpleasant sensation, or in other words in accordance with the senses of the driver.

(2) When the host vehicle position is included in the predetermined distance range D6 based on the toll booth Tb, the first convergence start scene is determined. When the host vehicle C is within the predetermined distance range D7 or D8 based on the fork in the side road Rj2 of the SA or PA or the intermediate point thereof, the second or third convergence start scene is determined. Hence, the convergence start timing can be determined during convergence with the main road R1 from the SA or PA as well as from the vicinity of the toll booth Tb.

(3) When the host vehicle C is within the predetermined distance range D1 or D2 based on the thick broken line start point S1, the convergence completion scene is determined. By using the road surface markings indicating the convergence section, a scene in which the driver determines that convergence is complete can be set as the convergence completion scene.

(4) When the host vehicle C passes the toll booth Tb, it is determined that the convergence start timing has arrived. Hence, a traveling distance from the geographical location in which the start of convergence is determined to the point at which convergence with the main road R1 occurs can be set as an appropriate distance for performing convergence start driving support such as shift control. Further, when the host vehicle C passes the fork or the intermediate point of the side road Rj2 connected to the SA or PA, it is determined that the convergence start timing has arrived. Hence, the convergence start timing can also be determined during convergence with the main road R1 from the SA or PA.

(5) When the host vehicle C has traveled at least a predetermined distance (100 m) after passing the thick broken line start point S1, it is determined that convergence is complete. During convergence, the convergence completion determination is performed using the thick broken line BL seen by the driver as a reference, and therefore the timing determination can be performed in accordance with the traveling environment. Furthermore, when the host vehicle C has traveled at least the predetermined distance after passing the convergence point, the convergence completion timing can be determined comparatively easily and accurately.

(6) When it is determined that the host vehicle has crossed the thick broken line BL, it is determined that convergence is complete. In other words, during convergence, the convergence completion determination is performed using the thick broken line BL seen by the driver as a reference, and therefore the timing at which the driver determines that convergence is complete can be detected.

(7) The support control unit 2 detects the convergence start timing and the convergence completion timing, and therefore the period from the start of convergence to convergence completion can be detected as a convergence section (or a convergence period). Hence, the convergence section and the convergence period can be used effectively during driving support and so on.

(8) The support control unit 2 determines whether or not the condition of the host vehicle C at a given point in time corresponds to the exit start scene in advance, and determines the exit start timing when the host vehicle C is in the exit start scene. Hence, driving support corresponding to the exit start can be executed on the basis of the detected exit start timing when the driver senses that the exit has begun. As a result, driving support can be performed such that the driver does not experience an unpleasant sensation.

(9) When the thick broken line BL is determined to exist in front of the host vehicle C, the host vehicle C is in the exit start scene. Further, the exit start timing at which the host vehicle C exits the main road R1 is determined to have arrived on the basis of the determination made by the image processor 8 that the host vehicle C has crossed the thick broken line BL. As a result, the timing at which the driver determines that the exit has begun can be detected, and driving support can be performed at an appropriate timing.

(10) During the exit start determination, the length of the thick broken line BL is detected, and when the length of the thick broken line BL exceeds a predetermined length (100 m), determinations are made as to whether or not the relative distance of the host vehicle position from the start point S2 of the zebra zone Zb is smaller than the straight exit determination distance and whether or not the host vehicle C is traveling along the travel lane L5 on which a straight exit can be made. Hence, the timing at which the driver determines that the exit has begun can also be detected, such that driving support can be performed at an appropriate timing, when the host vehicle C is traveling along the travel lane L5 on which a straight exit can be made and the distance from the start point S2 is smaller than the straight exit determination distance.

(11) When a plurality of thick broken lines BL exist, the exit determination portion 3c determines that the thick broken line BL near the exit road Rw is the thick broken line BL that separates the main road R1 from the exit road Rw. Thus, it is possible to respond to various road surface marking patterns.

(12) A determination is made in advance as to whether or not the condition of the host vehicle C at a given point in time corresponds to the exit completion scene, and when the host vehicle C is in the exit completion scene, the exit completion timing is determined. Hence, driving support corresponding to completion of the exit can be executed on the basis of the detected exit completion timing when the driver senses that the exit is complete. As a result, driving support in which the driver does not experience an unpleasant sensation can be performed.

(13) When the host vehicle position is included in the predetermined distance range D4 based on the toll booth Tb, it is determined that the host vehicle in the exit completion scene. Hence, a scene in which the driver determines that the exit is complete can be detected as the exit completion scene. When the host vehicle C is located within the predetermined distance ranges D5, D6 based on a fork or an intermediate point in the side road Rj2 of an SA or a PA, the host vehicle C is determined to be in the exit completion scene. Hence, the exit completion timing can be determined during exit out from the main road R1 to an SA or a PA as well as the vicinity of a toll booth Tb.

(14) During the exit completion determination, the exit completion timing is determined to have arrived when the host vehicle C passes the toll booth Tb. Hence, the time at which the driver determines that the exit is complete can be detected as the exit completion timing.

(15) During the exit completion determination, the exit completion timing is determined to have arrived when the host vehicle C passes the fork or the intermediate point in the side road Rw2 connected to the SA or PA. Hence, the exit completion timing can also be determined during convergence with the main road R1 from an SA or a PA.

Note that the embodiment described above may be modified in the following ways.

In addition to detecting convergence and exit timings on an expressway, the support control unit 2 may be an apparatus for detecting convergence and exit timings on a toll road or a main road other than an expressway. On a road that does not include toll booths and SA/PAs, the various scenes may be determined using a relative distance from a convergence node Nm or the like as a reference, and convergence completion or exit completion may be determined when the host vehicle C crosses the thick broken line BL.

The respective values of the predetermined distance ranges D1 to D8 may be modified.

In the exit completion scene, instead of indicating that control corresponding to an SA or a PA is permitted by switching the SA/PA control permission flag ON and OFF, the host vehicle position, the facility data included in the map rendering data 6b, and so on may simply be referred to such that control corresponding to an SA or a PA is permitted when the host vehicle position matches an SA or a PA.

During the convergence completion scene determination, instead of determining whether or not the host vehicle position is within the predetermined distance ranges D1, D2 from the thick broken line start point S1 in the step S6-6 and the step S6-9, a determination may be made as to whether or not the host vehicle C is within a distance range centering on a reference point (a start point, for example) set in relation to the zebra zone Zb.

The camera 30 may be attached to the side of the host vehicle C, for example to a side mirror or the like. The camera 30 may also be attached to the front end of the vehicle.

During the convergence completion determination, the determination processing as whether or not the host vehicle C has traveled at least the predetermined distance after passing the thick broken line start point S1 (step S16-1) and whether or not the host vehicle C has traveled at least the predetermined distance after passing the convergence point (step S16-5) may be omitted.

Instead of calculating the relative distance using the thick broken line start point S1 as a reference point in the steps S6-5 and S6-8 of the convergence completion scene determination, the start point S2 of the zebra zone Zb or the convergence node Nm may be used as the reference point.

One or both of detection of the exit start timing and the exit completion timing may be omitted such that the support control unit 2 is used as an apparatus for detecting the convergence start timing and the convergence completion timing.

The invention claimed is:

1. A method for determining a traveling condition of a host vehicle during an exit from a main road to an access road, comprising:
   accessing, with a processor, a host vehicle position;
   accessing, with the processor, road network data including road types;
   accessing, with the processor, road surface marking property data including road surface marking positions;
   based on the host vehicle position, the road network data, and the road surface marking property data, determining, with the processor, that a condition of the host vehicle corresponds to an exit start scene when a position of a broken line marking in front of the host vehicle and a position of zebra zone in front of the host vehicle match, the broken line marking indicating an exit section; and
   determining, with the processor, an exit start timing of the host vehicle when the condition is determined to correspond to the exit start scene by:
      obtaining a relative distance between the host vehicle position and a reference point indicating an end point of the exit section when a length of the broken line marking is equal to or greater than a predetermined length; and
      determining that the exit start timing has arrived when the relative distance is shorter than a predetermined length and the host vehicle has crossed the broken line marking.

2. An apparatus for determining a traveling condition of a host vehicle during an exit from a main road to an access road, comprising:
   a memory storing:
      road network data including road types; and
      road surface marking property data including at least road surface marking positions; and
   a processor programmed to:
      calculate a host vehicle position;
      based on the host vehicle position, the road network data, and the road surface marking property data, determine that a condition of the host vehicle corresponds to an exit start scene when a position of a broken line marking in front of the host vehicle and a position of zebra zone in front of the host vehicle match, the broken line marking indicating an exit section;
      determine an exit start timing from the main road to the access road when it is determined that the condition corresponds to the exit start scene;
      output a control signal for performing driving support during the start of the exit when the exit start timing is determined; and
      when a length of the broken line marking is equal to or greater than a predetermined length, obtain a relative distance between the host vehicle position and a reference point indicating an end point of the exit section, and when the relative distance is shorter than a predetermined length and the host vehicle has crossed the broken line marking, the timing determination unit determines that the exit start timing has arrived.

3. An apparatus for determining a traveling condition of a host vehicle during an exit from a main road to an access road, comprising:
   a memory storing:
      road network data including road types; and
      road surface marking property data including at least road surface marking positions; and
   a processor programmed to:
      calculate a host vehicle position;
      based on the host vehicle position, the road network data, and the road surface marking property data, determine that a condition of the host vehicle corresponds to an exit start scene when a position of a broken line marking in front of the host vehicle and a position of zebra zone in front of the host vehicle match, the broken line marking indicating an exit section;
      determine an exit start timing from the main road to the access road when it is determined that the condition corresponds to the exit start scene;
      output a control signal for performing driving support during the start of the exit when the exit start timing has been determined; and
      determine that the exit start timing has arrived when a lane along which the host vehicle is traveling is an exit lane connected directly to the access road and a relative distance between the host vehicle position and a reference point indicating an end point of the exit section is shorter than a predetermined length.

4. A method for determining a traveling condition of a host vehicle during convergence with a main road from an access road, comprising:
   accessing, with a processor, a host vehicle position;
   accessing, with the processor, road network data including road types;
   accessing, with the processor, road surface marking property data including road surface marking positions;
   based on the host vehicle position, the road network data, and the road surface marking property data, determining, with the processor, that a condition of the host vehicle corresponds to a convergence completion scene when the host vehicle position is included in a subject section which is set so as to center on a start point of a broken line marking in front of the host vehicle and corresponds to a length of the broken line marking, the broken line marking indicating a convergence section; and determining, with the processor, a convergence completion timing of the host vehicle when the condition is determined to correspond to the convergence completion scene by:
obtaining a relative distance between the host vehicle position and a reference point indicating a start point of the convergence when the length of the broken line marking is equal to or greater than a predetermined length; and
determining that the convergence completion timing has arrived when the relative distance is greater than a predetermined length and the host vehicle has crossed the broken line marking.

5. An apparatus for determining a traveling condition of a host vehicle during convergence with a main road from an access road, comprising:
a memory storing:
road network data including road types; and
road surface marking property data including at least road surface marking positions; and
a processor programmed to:
calculate a host vehicle position;
based on the host vehicle position, the road network data, and the road surface marking property data, determine that condition of the host vehicle corresponds to a convergence completion scene when the host vehicle position is included in a subject section which is set so as to center on a start point of a broken line marking in front of the host vehicle and corresponds to a length of the broken line marking, the broken line marking indicating a convergence section;
determine a convergence completion timing when it is determined that the condition corresponds to the convergence completion scene; and
output a control signal for performing driving support during convergence completion when the convergence completion timing is determined;
when the length of the broken line marking is equal to or greater than a predetermined length, obtain a relative distance between the host vehicle position and a reference point indicating a start point of the convergence; and
when the relative distance is greater than a predetermined length and the host vehicle has crossed the broken line marking, determine that the convergence completion timing has arrived.

6. A method for determining a traveling condition of a host vehicle during an exit from a main road to an access road, comprising:
accessing, with a processor, a host vehicle position;
accessing, with the processor, road network data including road types;
accessing, with the processor, road surface marking property data including road surface marking positions;
based on the host vehicle position, the road network data, and the road surface marking property data, determining, with the processor, that a condition of the host vehicle corresponds to an exit start scene when a position of a broken line marking in front of the host vehicle and a position of zebra zone in front of the host vehicle match, the broken line marking indicating an exit section; and
determining, with the processor, an exit start timing of the host vehicle when the condition is determined to correspond to the exit start scene by determining that the exit start timing has arrived when a lane along which the host vehicle is traveling is an exit lane connected directly to the access road and a relative distance between the host vehicle position and the reference point indicating the end point of the exit section is shorter than a predetermined length.

7. A method for determining a traveling condition of a host vehicle during convergence with a main road from an access road, comprising:
accessing, with a processor, a host vehicle position;
accessing, with the processor, road network data including road types;
accessing, with the processor, road surface marking property data including road surface marking positions;
based on the host vehicle position, the road network data, and the road surface marking property data, determining, with the processor, that a condition of the host vehicle corresponds to a convergence completion scene when the host vehicle position is included in a subject section which is set so as to center on a start point of a broken line marking in front of the host vehicle and corresponds to a length of the broken line marking, the broken line marking indicating a convergence section; and
determining, with the processor, a convergence completion timing of the host vehicle when the condition is determined to correspond to the convergence completion scene by determining that the convergence completion timing has arrived when the host vehicle is traveling the access road that is directly connected to a lane of the main road and a relative distance between the host vehicle position and the reference point indicating the start point of the convergence is greater than a predetermined length.

8. An apparatus for determining a traveling condition of a host vehicle during convergence with a main road from an access road, comprising:
a memory storing:
road network data including road types; and
road surface marking property data including at least road surface marking positions;
a processor programmed to:
calculate a host vehicle position;
based on the host vehicle position, the road network data, and the road surface marking property data, determines that condition of the host vehicle corresponds to a convergence completion scene when the host vehicle position is included in a subject section which is set so as to center on a start point of a broken line marking in front of the host vehicle and corresponds to a length of the broken line marking, the broken line marking indicating a convergence section;
determine a convergence completion timing when it is determined that the condition corresponds to the convergence completion scene;
output a control signal for performing driving support during convergence completion when the convergence completion timing is determined;
determines that the convergence completion timing has arrived when the host vehicle is traveling the access road that is directly connected to a lane of the main road and a relative distance between the host vehicle position and a reference point indicating the start point of the convergence is greater than a predetermined length.

* * * * *